(12) United States Patent
Park

(10) Patent No.: US 10,539,472 B2
(45) Date of Patent: Jan. 21, 2020

(54) INORGANIC THERMOCHROMIC ADDITIVE FOR AN INORGANIC CERAMIC COATING COMPOSITION

(71) Applicants: THERMOLON KOREA CO., LTD., Busan (KR); The Cookware Company Global Sourcing Limited, Kowloon (HK)

(72) Inventor: Chung Kwon Park, Busan (KR)

(73) Assignees: Thermolon Korea Co., Ltd., Busan (KR); The Cookware Company Global Sourcing Limited, Kowloon (HK)

( * ) Notice: Subject to any disclaimer, the term of this patent is extended or adjusted under 35 U.S.C. 154(b) by 372 days.

(21) Appl. No.: 15/526,454

(22) PCT Filed: Sep. 2, 2015

(86) PCT No.: PCT/EP2015/069998
§ 371 (c)(1),
(2) Date: May 12, 2017

(87) PCT Pub. No.: WO2016/034606
PCT Pub. Date: Mar. 10, 2016

(65) Prior Publication Data
US 2017/0328789 A1  Nov. 16, 2017

(30) Foreign Application Priority Data

Sep. 2, 2014  (EP) ..................................... 14183252

(51) Int. Cl.
| | | |
|---|---|---|
| G01K 11/14 | (2006.01) | |
| A47J 36/04 | (2006.01) | |
| C04B 35/14 | (2006.01) | |
| C09K 9/00 | (2006.01) | |

(52) U.S. Cl.
CPC .............. *G01K 11/14* (2013.01); *A47J 36/04* (2013.01); *C04B 35/14* (2013.01); *C09K 9/00* (2013.01); *C04B 2235/3272* (2013.01); *C04B 2235/404* (2013.01); *C04B 2235/483* (2013.01); *G01K 2207/06* (2013.01); *G01K 2207/08* (2013.01)

(58) Field of Classification Search
CPC .............. G01K 11/14; G01K 2207/06; G01K 2207/08; A47J 36/04; C04B 35/14; C04B 2235/3272; C04B 2235/404; C04B 2235/483; C09K 9/00

USPC .......................................................... 252/583
See application file for complete search history.

(56) References Cited

U.S. PATENT DOCUMENTS

| | | | |
|---|---|---|---|
| 3,781,523 A | 12/1973 | Borom | |
| 5,214,008 A | 5/1993 | Beckwith et al. | |
| 2010/0181322 A1 | 7/2010 | Perillon et al. | |
| 2011/0095242 A1 | 4/2011 | Jin et al. | |
| 2012/0052265 A1* | 3/2012 | Le Bris | A47J 36/02 |
| | | | 428/204 |
| 2013/0149441 A1* | 6/2013 | Choi | B05D 5/065 |
| | | | 427/162 |

FOREIGN PATENT DOCUMENTS

| | | | |
|---|---|---|---|
| CN | 102370432 A | | 3/2012 |
| CN | 103158290 A | | 6/2013 |
| CN | 103416495 A | * | 12/2013 |
| CN | 103416495 A | | 12/2013 |
| EP | 0 287 336 A1 | | 10/1988 |
| WO | 2011117470 A1 | | 9/2011 |

OTHER PUBLICATIONS

PCT International Search Report and Written Opinion dated Nov. 24, 2015 for PCT International Patent Application No. PCT/EP2015/069998, 12 pages.
PCT Notification Concerning Transmittal of International Preliminary Report on Patentability of the International Searching Authority, dated Aug. 22, 2016 in connection with PCT International Patent Application No. PCT/EP2015/069998, 13 pages.

* cited by examiner

*Primary Examiner* — Ling Siu Choi
*Assistant Examiner* — Ronald Grinsted
(74) *Attorney, Agent, or Firm* — Amster, Rothstein & Ebenstein LLP

(57) ABSTRACT

The present invention relates to an inorganic thermochromic additive for an inorganic ceramic coating composition, comprising a thermally colour-changeable yellow inorganic pigment, a thermally colour-changeable green inorganic pigment, and optionally a white inorganic pigment. It also relates to a thermally colour-changeable ceramic coating composition comprising the inorganic thermochromic additive and the inorganic ceramic coating composition. The present invention further provides a kit for preparing the thermally colour-changeable ceramic coating composition. The present invention further relates to an artefact, in particular a cookware item coated with the thermally colour-changeable ceramic coating composition, and to the use of the thermally colour-changeable ceramic coating composition for coating an artefact, in particular a cookware item.

11 Claims, 5 Drawing Sheets

INORGANIC THERMOCHROMIC ADDITIVE FOR AN INORGANIC CERAMIC COATING COMPOSITION

CROSS-REFERENCE TO RELATED APPLICATIONS

This application is a U.S. national stage entry under 35 U.S.C. § 371 of PCT International Patent Application No. PCT/EP2015/069998, filed Sep. 2, 2015, which claims priority to European Patent Application No. 14183252.7, filed Sep. 2, 2014, the contents of which are incorporated herein by reference in their entirety.

FIELD OF THE INVENTION

The present invention relates to an inorganic thermochromic additive for an inorganic ceramic coating composition. It relates the thermally colour-changeable (i.e., thermochromic) inorganic ceramic coating composition comprising the inorganic thermochromic additive and the inorganic ceramic coating composition. In particular it relates to a thermally colour-changeable ceramic coating composition, a non-stick thermally colour-changeable ceramic coating composition, and to an artefact, in particular cookware, coated with the thermally inorganic ceramic colour-changeable coating. The present invention further relates to the use of the thermally colour-changeable inorganic ceramic coating compositions for coating an artefact, for instance a cookware item.

BACKGROUND OF THE INVENTION

Non-stick coatings that reversibly change colour responsive to a temperature change have many applications, for instance, in cookware such as pots, pans and cooking utensils, as well as in various types of heaters (e.g. wood burning stoves, heating boilers, infra-red heaters etc), fans, refrigerators, irons, building materials, health aids, personal care products such as hair straighteners, curling tongs, and industrial products, etc.

A problem in the art is that the coatings for use in cookware need to withstand temperatures of at least 200° C., whilst maintaining a non-stick function and without degradation of the incorporated thermochromic agents. Colour change agents of the art rely at least on organic pigments, for instance, perylene red, which are affected by the high temperatures such that the colour change becomes irreversible. Alternatively, the colour change agent may be affected by cooking ingredients such as oils that taint the coating unevenly, and give the appearance of an unclean surface. Degradation of the coating can lead to the release of toxins, which are to be avoided in any cookware applications. Furthermore, the extent of colour change in the art is often not sufficient to discern a colour change, thereby requiring the presence of two patterns that change colour differentially upon heating to obtain a visible contrast (e.g. U.S. Pat. No. 6,551,693 B1). The pattern is limited in area to a central medallion that reflects the pan temperature only at one location, while the periphery of the pan may be at an insufficient temperature.

In view thereof, there remains a need in the art for further and/or improved thermally colour-changeable ceramic coating compositions for instance for use on any artefact, in particular for non-stick coatings, in particular on a cookware item.

The present coating compositions and coatings aim to overcome the problems in the art.

SUMMARY OF THE INVENTION

Through extensive experimental formulation and testing, the present inventors have realized a thermally colour-changeable ceramic coating composition overcoming at least some of the problems of the prior art.

In a first aspect relates to an inorganic thermochromic additive for an inorganic ceramic coating composition, comprising a thermally colour-changeable yellow inorganic pigment, optionally a thermally colour-changeable green inorganic pigment, and optionally a white inorganic pigment. The inorganic ceramic coating composition may comprise a thermally colour-changeable yellow inorganic pigment, a thermally colour-changeable green inorganic pigment, and optionally a white inorganic pigment. The inorganic thermochromic additive may comprise 15-24 parts by weight colour-changeable yellow inorganic pigment, 1-6 parts by weight colour-changeable green inorganic pigment, and 0-9 parts by weight white inorganic pigment, wherein the parts by weight of colour-changeable yellow inorganic pigment, colour-changeable green inorganic pigment and white inorganic pigment add up to a total of 25. The thermally colour-changeable yellow inorganic pigment may be present at 3-75 wt %, the thermally colour-changeable green inorganic pigment may be present at 2-12 wt %, and the white inorganic pigment may optionally be present at 8-95 wt %, with wt % compared with the total weight of the inorganic thermochromic additive. Addition of the inorganic thermochromic additive to the inorganic ceramic coating composition forms a thermally colour-changeable ceramic coating composition. In certain embodiments, the thermally colour-changeable yellow inorganic pigment is one or more metal pigments comprising niobium (Nb), tin (Sn), zinc (Zn), or titanium (Ti). In certain embodiments, the thermally colour-changeable green inorganic pigment is an iron oxide pigment. In certain embodiments, the white inorganic pigment comprises one or more of titanium dioxide, silicon dioxide, aluminium hydroxide, and zirconium oxide. An aspect relates to a use of an inorganic thermochromic additive for preparing a thermally colour-changeable ceramic coating composition.

In a second aspect, a thermally colour-changeable ceramic coating composition comprises the inorganic thermochromic additive and the inorganic ceramic coating composition. The inorganic ceramic coating composition may comprise silica.

The thermally colour-changeable ceramic coating composition may comprise: 68-80% by weight (wt %) of the inorganic ceramic coating composition, 0-25 wt % of a white inorganic pigment, 1-20 wt % of a thermally colour-changeable yellow inorganic pigment, and 0-3 wt % of a thermally colour-changeable green inorganic pigment, with wt % compared with the total weight of the thermally colour-changeable ceramic coating composition. The thermally colour-changeable green inorganic pigment may be present at 1-3 wt %, with wt % compared with the total weight of the thermally colour-changeable ceramic coating composition. The white inorganic pigment is present at 2-25 wt %, with wt % compared with the total weight of the thermally colour-changeable ceramic coating composition.

The thermally colour-changeable ceramic coating composition embodying the principles of the present invention advantageously allows preparing a thermally colour-changeable ceramic coating which indicates a colour change when an ideal temperature such as an ideal operating temperature is reached. For example, the present thermally colour-changeable ceramic coating composition advantageously allows preparing a thermally colour-changeable ceramic coating which indicates when the food can be placed in a pan at cooking temperature. Thus, when the thermally colour-changeable ceramic coating composition as taught herein is coated on an artefact such as a frying pan, it can be easily visually seen whether the artefact is suitably heated. The thermally colour-changeable ceramic coating composition may be applicable for any artefact requiring a visual indication of temperature change, such as a heating stove, a heating boiler, cooking utensils (e.g. spoons, ladles, etc.), fans, refrigerators, irons, building materials, health aids, hair care products such as hair straighteners and curling irons and industrial products.

Further, the present thermally colour-changeable ceramic coating composition allows preparing a thermally colour-changeable ceramic coating having long-lasting reversible colour-changeable properties and may have high quality non-stick properties. In addition, the thermally colour-changeable ceramic coating composition allows various oil stains to be easily wiped from the coated cookware and cooking utensils.

In certain embodiments, the inorganic ceramic coating composition comprises:
(a) 6-25 wt % of a silane or an oligomer thereof as a binder;
(b) 25-60 wt % of a silica mixture;
(c) 0-10 wt % of a functional filler; and/or
ceramic powder that emits far-infrared radiation and anions, with wt % compared with the total weight of the inorganic ceramic coating composition.

Such inorganic ceramic coating composition provides non-stick properties to a thermally colour-changeable ceramic coating layer. A thermally colour-changeable ceramic coating layer comprising such inorganic ceramic coating composition emits anions, radiates far infrared rays, is non-stick and is non-toxic to the human body. A thermally colour-changeable ceramic coating layer comprising such inorganic ceramic coating composition, when coated on the interior of a cookware such as a pan, is excellent in corrosion resistance, abrasion resistance, heat resistance, and prevents food from sticking thereto when heating the food.

The functional filler advantageously allows to prevent cracking between the binder and the silica mixture in a coating layer and to control the viscosity of the inorganic ceramic coating composition in order to improve the physical and chemical properties of the coating layer.

In certain embodiments, the silica mixture is bound to the silane or oligomer derived thereof by a chemical reaction.

In certain embodiments, the silica mixture contains 20-40 wt % of silicon dioxide ($SiO_2$) powder having a particle size of 0.2-1.0 µm and 80-60 wt % of water, with wt % compared with the total weight of the silica mixture.

In certain embodiments, the functional filler comprises at least one natural mineral material selected from the group consisting of quartz, monzonite, gneiss and rhyolitic tuff.

In certain embodiments, the far-infrared ray-radiating material and the anion-emitting material are mixed at a weight ratio of 1:1.

In certain embodiments, the far-infrared ray-radiating material comprises at least one natural ore material selected from the group consisting of tourmaline, loess, sericite, amethyst, raw ore, bamboo charcoal, Uiwangseok (natural ore), obsidian, elvan, yellow ocher, Sanggwangsuk, kiyoseki, Kwangmyeongsuk, and lava.

In certain embodiments, the anion-emitting material is an element selected from the group consisting of strontium, vanadium, zirconium, cerium, neodymium, lanthanum, barium, rubidium, cesium, and gallium.

A third aspect relates to a thermally colour-changeable ceramic coating prepared from the thermally colour-changeable ceramic coating composition as taught herein. A thermally colour-changeable ceramic coating embodying the principles of the present invention allows indicating a colour change when an ideal temperature such as an ideal cooking temperature or other operating temperature for instance is reached. For example, the present thermally colour-changeable ceramic coating advantageously allows indicating when the food can be placed in pan. Thereby, the present thermally colour-changeable ceramic coating ensures optimal preservation of nutrients and flavour and prevents overheating of the pan.

Furthermore, the present thermally colour-changeable ceramic coating has long-lasting reversible colour-changeable properties which do not change by thermal cycling or exposure to high temperatures. Also, the present thermally colour-changeable ceramic coating maintains a non-stick function. The present inventors have found that the non-stick quality of the present thermally colour-changeable ceramic coating is not degraded by the presence of the thermally colour-changeable inorganic pigments.

A further aspect relates to a kit for preparing a thermally colour-changeable ceramic coating composition as taught herein, or a thermally colour-changeable ceramic coating as taught herein, comprising:
(a) a first solution comprising a silica mixture, a functional filler, a ceramic powder that emits far-infrared radiation material and anions, a white inorganic pigment, a thermally colour-changeable yellow inorganic pigment, and a thermally colour-changeable green inorganic pigment in a first container; and
(b) a second solution comprising a silane or an oligomer thereof as a binder.

Such a kit advantageously allows preparing the thermally colour-changeable ceramic coating composition as taught herein, and the thermally colour-changeable ceramic coating prepared from the thermally colour-changeable ceramic coating composition as taught herein.

A further aspect relates to an artefact, in particular a cookware item coated with the thermally colour-changeable ceramic coating as taught herein. Advantageously, the coated artefact according to the present invention changes colour when the ideal operating temperature is reached. For instance, a cookware item coated with the thermally colour-changeable ceramic coating composition as taught herein gives an indication that the cookware item such as a pan is evenly heated. For healthy cooking it is important that the cookware item has reached the correct temperature when the food is placed in the cookware. Using the correct cooking temperature ensures that the food is prepared in a healthy way without loss of nutrients and flavour. It also ensures that food is not undercooked Therefore, the coated cookware item according to the present invention is particularly suited for easy and healthy cooking.

The coated cookware item according to the present invention indicates the ideal cooking temperature while at the same time maintaining the advantages of a non-stick coating of high quality. Also, the present coated artefact in particular, coated cookware item can be produced in an environmentally friendly manner as organic pigments can be mainly avoided.

In certain embodiments, the interior surface of the cookware is coated with the thermally colour-changeable ceramic coating composition. Coating the interior of the cookware advantageously allows easily observing the colour change visually and hence allows easily visually observing that the cookware reached the ideal temperature for cooking purposes.

A further aspect relates to the use of a thermally colour-changeable ceramic coating composition as taught herein for coating an artefact, in particular a cookware item.

In certain embodiments, the use as taught herein is for coating the interior surface of the cookware item. Coating the interior of the cookware item advantageously allows easy visual observation of the colour change and hence allows easy visually observation that the cookware reached a temperature useful for cooking purposes.

LEGENDS TO THE FIGURES

Figure 3:
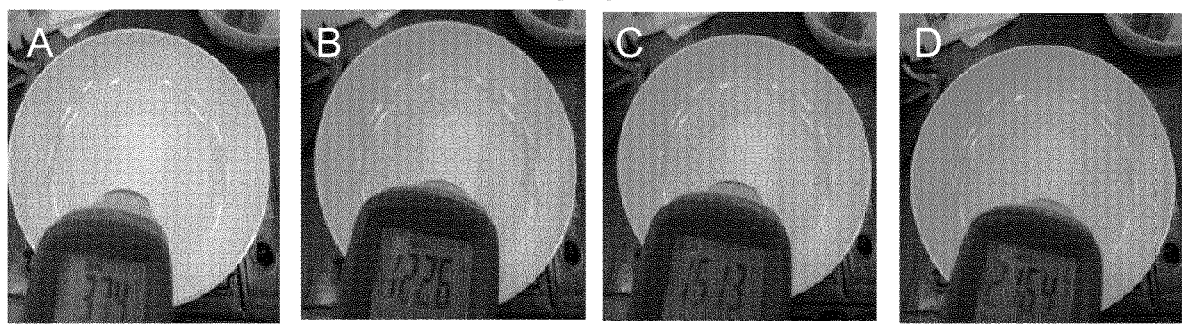

FIG. 3 represents photographs illustrating the colour change of a frying pan coated with a thermally colour-changeable ceramic coating composition according to an embodiment of the invention (composition I in Table 2) with an increase in temperature at room temperature (FIG. 3A), at about 120° C. (FIG. 3B), at about 150° C. (FIG. 3C), and at about 220° C. (FIG. 3D).

Figure 4:
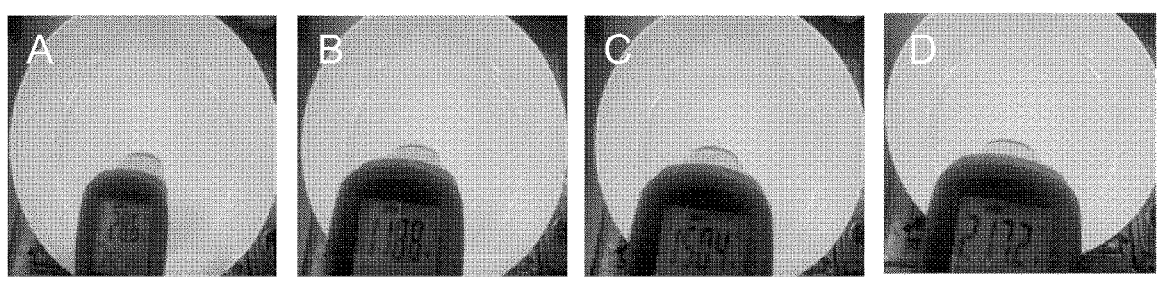

FIG. 4 represents photographs illustrating the colour change of a frying pan coated with a thermally colour-changeable ceramic coating composition according to an embodiment of the invention (composition II in Table 2) with an increase in temperature at room temperature (FIG. 4A), at about 120° C. (FIG. 4B), at about 150° C. (FIG. 4C), and at about 220° C. (FIG. 4D).

Figure 5:
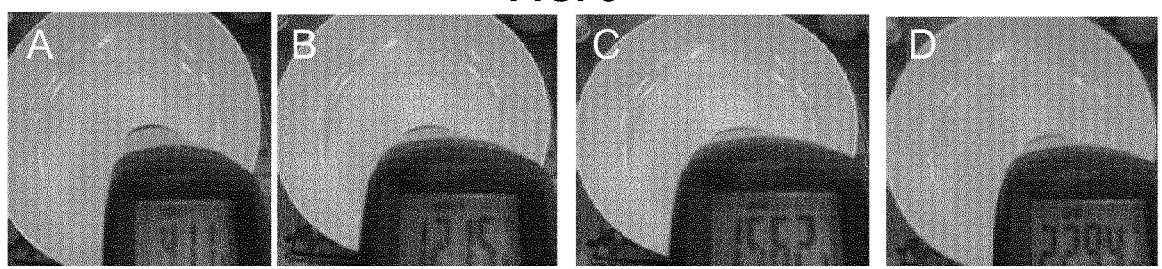

FIG. 5 represents photographs illustrating the colour change of a frying pan coated with a thermally colour-changeable ceramic coating composition according to an embodiment of the invention (composition III in Table 2) with an increase in temperature at room temperature (FIG. 5A), at about 120° C. (FIG. 5B), at about 150° C. (FIG. 5C), and at about 220° C. (FIG. 5D).

Figure 6:
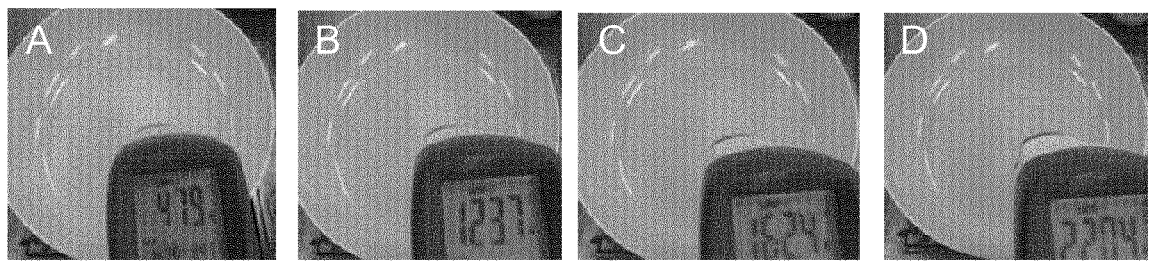

FIG. 6 represents photographs illustrating the colour change of a frying pan coated with a thermally colour-changeable ceramic coating composition according to an embodiment of the invention (composition IV in Table 2) with an increase in temperature at room temperature (FIG. 6A), at about 120° C. (FIG. 6B), at about 150° C. (FIG. 6C), and at about 220° C. (FIG. 6D).

Figure 7:
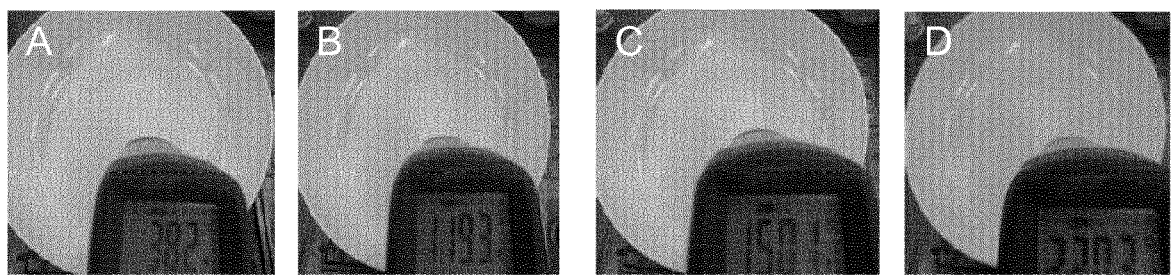

FIG. 7 represents photographs illustrating the colour change of a frying pan coated with a comparative coating composition (composition V in Table 2) with an increase in temperature at room temperature (FIG. 7A), at about 120° C. (FIG. 7B), at about 150° C. (FIG. 7C), and at about 220° C. (FIG. 7D).

Figure 8:
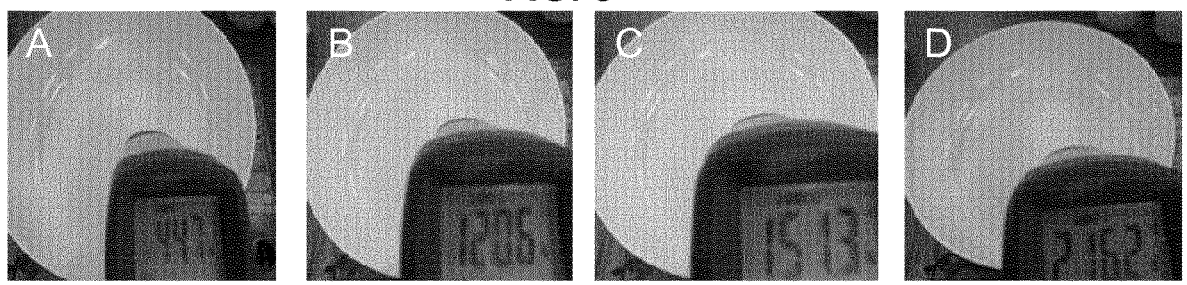

FIG. 8 represents photographs illustrating the colour change of a frying pan coated with a comparative coating composition (composition VI in Table 2) with an increase in temperature at room temperature (FIG. 8A), at about 120° C. (FIG. 8B), at about 150° C. (FIG. 8C), and at about 220° C. (FIG. 8D).

Figure 9:
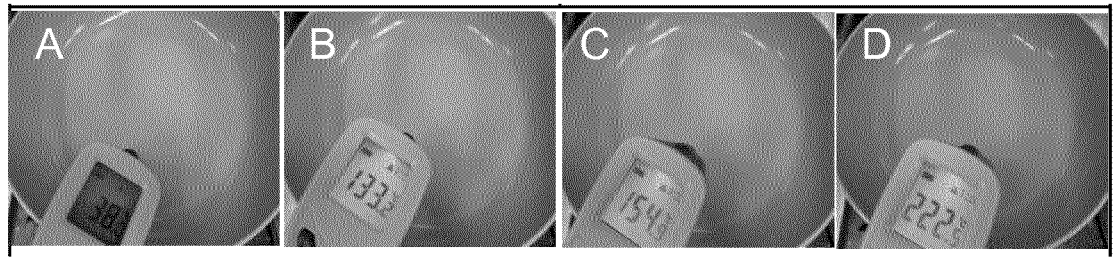

FIG. 9 represents photographs illustrating the colour change of a frying pan coated with a comparative coating composition (composition VII in Table 2) with an increase in temperature at room temperature (FIG. 9A), at about 120° C. (FIG. 9B), at about 150° C. (FIG. 9C), and at about 220° C. (FIG. 9D).

Figure 10:
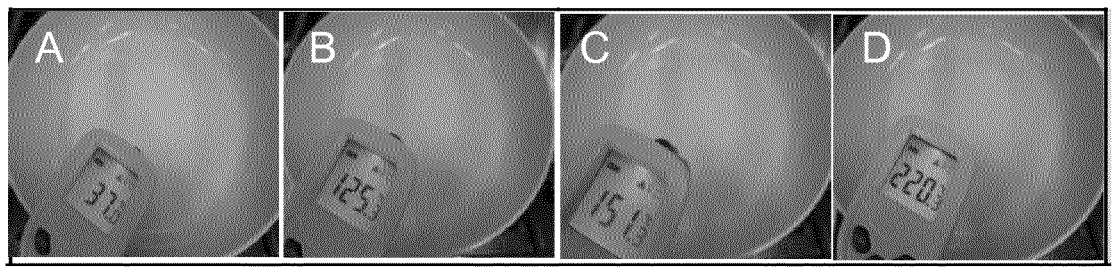

FIG. 10 represents photographs illustrating the colour change of a frying pan coated with a comparative coating composition (composition VIII in Table 2) with an increase in temperature at room temperature (FIG. 10A), at about 120° C. (FIG. 10B), at about 150° C. (FIG. 10C), and at about 220° C. (FIG. 10D).

Figure 11:
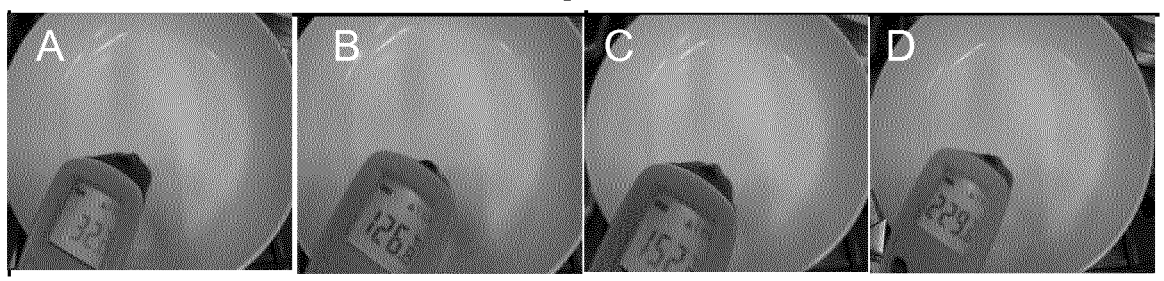

FIG. 11 represents photographs illustrating the colour change of a frying pan coated with a comparative coating composition (composition IX in Table 2) with an increase in temperature at room temperature (FIG. 11A), at about 120° C. (FIG. 11B), at about 150° C. (FIG. 11C), and at about 220° C. (FIG. 11D).

Figure 12:
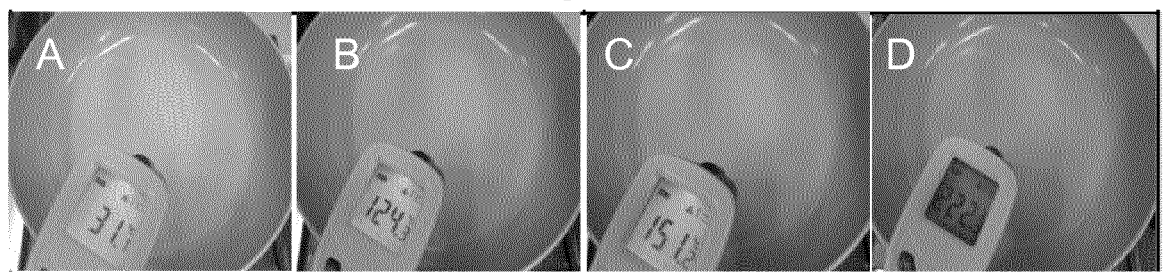

FIG. 12 represents photographs illustrating the colour change of a frying pan coated with a comparative coating composition (composition X in Table 2) with an increase in temperature at room temperature (FIG. 12A), at about 120° C. (FIG. 12B), at about 150° C. (FIG. 12C), and at about 220° C. (FIG. 12D).

Figure 13A:
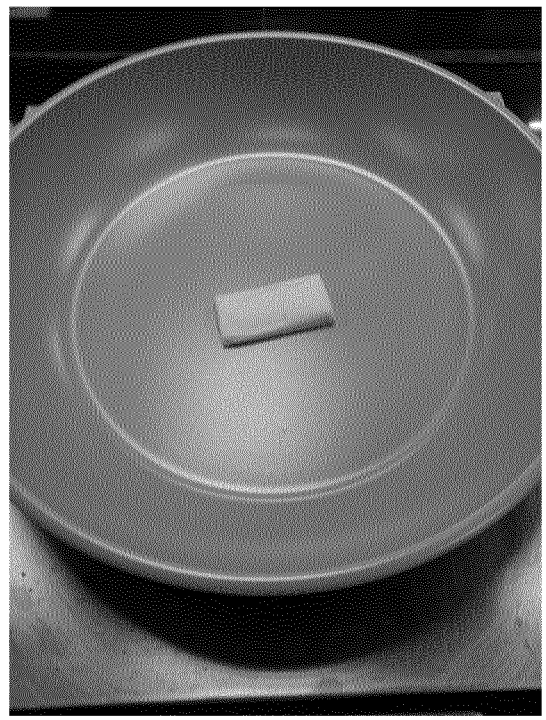
Figure 13B:
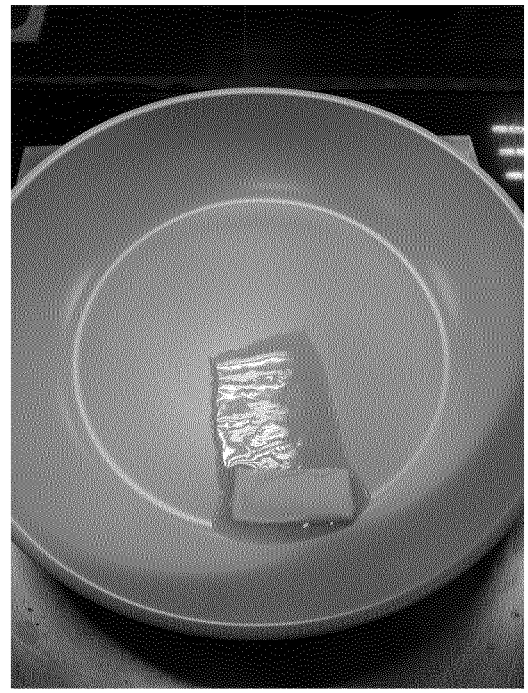

FIG. 13A and FIG. 13B represent photographs illustrating the colour change of prior art frying pans at temperatures which hardly melt butter (32-35° C.). FIG. 13A shows the pan at ambient temperature, having no colour change. FIG. 13B illustrates the pan having undergone an almost uniform colour change to white at a temperature that only just melts butter.

DETAILED DESCRIPTION OF THE INVENTION

Before the present method used in the invention is described, it is to be understood that this invention is not limited to particular methods, components, or devices described, as such methods, components, and devices may, of course, vary. It is also to be understood that the terminology used herein is not intended to be limiting, since the scope of the present invention will be limited only by the appended claims.

As used herein, the singular forms "a", "an", and "the" include both singular and plural referents unless the context clearly dictates otherwise.

The terms "comprising", "comprises" and "comprised of" as used herein are synonymous with "including", "includes" or "containing", "contains", and are inclusive or open-ended and do not exclude additional, non-recited members, elements or method steps. The terms "comprising", "comprises" and "comprised of" also include the term "consisting of".

The recitation of numerical ranges by endpoints includes all numbers and fractions subsumed within the respective ranges, as well as the recited endpoints.

The term "about" as used herein when referring to a measurable value such as a parameter, an amount, a temporal duration, and the like, is meant to encompass variations of +/−10% or less, preferably +/−5% or less, more preferably +/−1% or less, and still more preferably +/−0.1% or less of and from the specified value, insofar such variations are appropriate to perform in the disclosed invention. It is to be understood that the value to which the modifier "about" refers is itself also specifically, and preferably, disclosed.

Unless otherwise defined, all terms used in disclosing the invention, including technical and scientific terms, have the meaning as commonly understood by one of ordinary skill in the art to which this invention belongs. By means of further guidance, definitions for the terms used in the description are included to better appreciate the teaching of the present invention.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

The present invention relates to a thermally colour-changeable ceramic coating that is thermally stable, and to an inorganic thermochromic additive for adding to a ceramic coating in order to provide the thermally colour-changeable properties.

The coating changes colour depending on the temperature of the coating, which colour change can be visually detected. The colour change is reversible. The coating is thermally stable, i.e. the coating resists breakdown at higher temperatures or can withstand prolonged cycles of heating and cooling without affecting the colour-changing performance. Moreover, the coating is also chemically stable insofar as the colour-changing performance is not affect by agents such as hot oils.

The thermally colour-changeable ceramic coating finds many applications, for instance, in non-stick cookware, specifically, pots and pans for the oven or stove-top. The applications include those where a non-stick property is advantageous, such as clothes irons, hair care products such as hair straighteners and curling irons. The applications include those where a non-stick property is not a requirement, such as in wood-burning-stoves, heating boilers, heaters in general. Other applications include health aids, building materials and industrial products.

By extensive experimental testing, the present inventors have realized a thermally colour-changeable ceramic coating composition comprising an inorganic ceramic coating composition, optionally a white inorganic pigment, a thermally colour-changeable yellow inorganic pigment, and optionally a thermally colour-changeable green inorganic pigment.

Accordingly, a first aspect relates to an inorganic thermochromic additive for an inorganic ceramic coating composition, comprising a thermally colour-changeable yellow inorganic pigment, optionally a thermally colour-changeable green inorganic pigment, and optionally a white inorganic pigment. Addition of the inorganic thermochromic additive to the inorganic ceramic coating composition forms a thermally colour-changeable ceramic coating composition. The inorganic thermochromic additive is preferably a liquid.

The proportions of pigment in the inorganic thermochromic additive in a preferred embodiment may be such that the thermally colour-changeable ceramic coating composition comprises 0-9 wt % of the white inorganic pigment, 15-24 wt % of the thermally colour-changeable yellow inorganic pigment and 1-5 wt % of a thermally colour-changeable green inorganic pigment, with wt % compared with the total weight of the thermally colour-changeable ceramic coating composition.

For instance, the inorganic thermochromic additive preferably comprises: 60-96 wt % or 60-80 wt % of the thermally colour-changeable yellow inorganic pigment; 4-24 wt % or 4 to 20 wt % of the thermally colour-changeable green inorganic pigment; and 0 to 36 wt % of the white inorganic pigment, with wt % compared with the total weight of the inorganic thermochromic additive.

The thermally colour-changeable yellow inorganic pigment may preferably be present at 60-80 wt %, the thermally colour-changeable green inorganic pigment may be present at 4-20 wt %, and the white inorganic pigment may optionally be present at 0-36 wt %, with wt % compared with the total weight of the inorganic thermochromic additive.

The proportions of pigment in the inorganic thermochromic additive may be such that the thermally colour-changeable ceramic coating composition contains 0-25 wt % of the white inorganic pigment, 1-20 wt % of the thermally colour-changeable yellow inorganic pigment and 0-3 wt % of a thermally colour-changeable green inorganic pigment, with wt % compared with the total weight of the thermally colour-changeable ceramic coating composition.

The inorganic thermochromic additive may comprise: 3-100 wt %, 3-75 wt %, 8 to 80%, or 8 to 28% of the thermally colour-changeable yellow inorganic pigment; 0-75 wt %, 2-75 wt %, 6-75 wt %, 0-12 wt %, 2-12 wt %, or 4-12 wt % of the thermally colour-changeable green inorganic pigment; and 0-96 wt %, 8-96%, 8-95%, 0.1 to 88%, or 2 to 88% of the white inorganic pigment, with wt % compared with the total weight of the inorganic thermochromic additive.

The thermally colour-changeable yellow inorganic pigment may be present at 3-75 wt %, the thermally colour-changeable green inorganic pigment may be present at 2-75 wt %, and the white inorganic pigment may optionally be present at 8-95 wt %, with wt % compared with the total weight of the inorganic thermochromic additive.

According to a preferred aspect, for 1 part by weight of colour-changeable yellow inorganic pigment there may be between 0.041667 and 0.4 parts by weight of colour-changeable green inorganic pigment in the inorganic thermochromic additive. The same ratio would be present in the thermally colour-changeable ceramic coating composition or in the thermally colour-changeable ceramic coating.

According to another preferred aspect, for 1 part by weight of colour-changeable yellow inorganic pigment, there may be between 0.041667 and 0.4 parts by weight of colour-changeable green inorganic pigment and between 0 and 0.6 parts by weight of white inorganic pigment in the inorganic thermochromic additive.

According to another preferred aspect, the inorganic thermochromic additive comprises 15-24 parts by weight colour-changeable yellow inorganic pigment, 1-6 parts by weight colour-changeable green inorganic pigment, and 0-9 parts by weight white inorganic pigment. There may be 25 parts total of colour-changeable yellow inorganic pigment and colour-changeable green inorganic pigment and white inorganic pigment. The inorganic thermochromic additive may consist 15-24 parts by weight colour-changeable yellow inorganic pigment, 1-6 parts by weight colour-changeable green inorganic pigment, and 0-9 parts by weight white inorganic pigment, and wherein the parts by weight of colour-changeable yellow inorganic pigment and colour-changeable green inorganic pigment and white inorganic pigment add up to a total of 25.

According to another preferred aspect, the inorganic thermochromic additive comprises 15-20 parts by weight colour-changeable yellow inorganic pigment, 1-5 parts colour-changeable green inorganic pigment, and 0-9 parts white inorganic pigment. There may be 25 parts total of colour-changeable yellow inorganic pigment, colour-changeable green inorganic pigment and white inorganic pigment.

According to one aspect, for 1 part by weight colour-changeable yellow inorganic pigment, there may be 0, 0.14, 0.15, 0.2, 0.25, 0.3, 0.4, 0.5, or 0.6 parts by weight of colour-changeable green inorganic pigment in the inorganic thermochromic additive, or a value in the between any two of the aforementioned values, preferably between 0.14 and 0.5, more preferably between 0.2 and 0.3. The same ratio would be present in the thermally colour-changeable ceramic coating composition or in the thermally colour-changeable ceramic coating.

According to another aspect, for 1 part by weight colour-changeable yellow inorganic pigment, there may be 0, 0.1, 0.5, 1, 1.5, 2, 2.4, 2.5, 3, 4, 5, 6, 7, 8, 9, 10, 11, 12 or 13 parts by weight of white inorganic pigment in the inorganic thermochromic additive, or a value in the between any two of the aforementioned values, preferably between 0.1 and 11, more preferably between 2.0 and 11, more preferably between 2.4 and 11. The same ratio would be present in the thermally colour-changeable ceramic coating composition or in the thermally colour-changeable ceramic coating.

According to another aspect, for 1 part by weight of colour-changeable yellow inorganic pigment, there may be between 0.14 to 0.5 parts by weight of colour-changeable green inorganic pigment and between 0.1 and 11 parts by weight of white inorganic pigment in the inorganic thermochromic additive. According to another aspect, for 1 part by weight of colour-changeable yellow inorganic pigment, there may be between 0.2 and 0.3 parts by weight of colour-changeable green inorganic pigment and between 2 and 11 parts by weight of white inorganic pigment in the inorganic thermochromic additive.

The thermally colour-changeable ceramic coating composition may contain 10 to 50 wt %, preferably 20 to 30 wt %, preferably 23 to 27 wt % inorganic thermochromic additive.

The same parts or ratios would be present in the thermally colour-changeable ceramic coating composition or in the thermally colour-changeable ceramic coating.

A second aspect relates to a thermally colour-changeable ceramic coating composition comprising the inorganic thermochromic additive and the inorganic ceramic coating composition. The thermally colour-changeable ceramic coating composition may comprise: 1 to 32% wt % inorganic thermochromic additive and 68-80% wt % of the inorganic ceramic coating composition, with wt % compared with the total weight of the thermally colour-changeable ceramic coating composition.

In a preferred aspect the thermally colour-changeable ceramic coating composition comprises: 22 to 32 wt % inorganic thermochromic additive and 68-80 wt % or 68-78 wt % of the inorganic ceramic coating composition, with wt % compared with the total weight of the thermally colour-changeable ceramic coating composition.

In a preferred aspect the thermally colour-changeable ceramic coating composition comprises: 23 to 27 wt % inorganic thermochromic additive and 73-77 wt % of the inorganic ceramic coating composition, with wt % compared with the total weight of the thermally colour-changeable ceramic coating composition.

In a preferred aspect the thermally colour-changeable ceramic coating composition comprises: 22-32 or 23-27 parts by weight inorganic thermochromic additive and 68-80 or 73-77 parts by weight of the inorganic ceramic coating composition, wherein the parts by weight of inorganic thermochromic additive and inorganic ceramic coating composition add up to 100.

Preferably, the thermally colour-changeable ceramic coating composition may comprise 0-9 wt % of the white inorganic pigment, 15-24 wt % of the thermally colour-changeable yellow inorganic pigment, 1-6 wt % of the thermally colour-changeable green inorganic pigment, and 68-80 wt % of the inorganic ceramic coating composition, with wt % compared with the total weight of the thermally colour-changeable ceramic coating composition. The thermally colour-changeable ceramic coating composition may comprise 1-5 wt % of the thermally colour-changeable green inorganic pigment and 15-20 wt % of the thermally colour-changeable yellow inorganic pigment, with wt % compared with the total weight of the thermally colour-changeable ceramic coating composition. The total amount of white inorganic pigment, thermally colour-changeable yellow inorganic pigment, and thermally colour-changeable green inorganic pigment may be between 22 and 32 wt %, preferably around 25 wt % compared with the total weight of the thermally colour-changeable ceramic coating composition.

The thermally colour-changeable ceramic coating composition may comprise 0-25 wt % of the white inorganic pigment, 1-20 wt % of the thermally colour-changeable yellow inorganic pigment, 0-3 wt % of the thermally colour-changeable green inorganic pigment, and 68-80% wt % of the inorganic ceramic coating composition, with wt % compared with the total weight of the thermally colour-changeable ceramic coating composition. The thermally colour-changeable ceramic coating composition may comprise 1-3 wt % of the thermally colour-changeable green inorganic pigment, with wt % compared with the total weight of the thermally colour-changeable ceramic coating composition. The total amount of white inorganic pigment, thermally colour-changeable yellow inorganic pigment, and thermally colour-changeable green inorganic pigment may be between 22 and 32 wt % compared with the total weight of the thermally colour-changeable ceramic coating composition.

In certain embodiments, the thermally colour-changeable ceramic coating composition as taught herein comprises 68-80%, preferably 73 to 77% by weight (wt %) of an inorganic ceramic coating composition and 22-32 wt %, preferably 22 to 27 wt % of inorganic thermochromic additive, with wt % compared with the total weight of the thermally colour-changeable ceramic coating composition.

The terms "thermally colour-changeable" or "thermochromic" may be used interchangeably and refer to the property of a substance or composition to undergo a reversible change of colour when the temperature is changed, e.g. when the substance or composition is heated or cooled. The reversible change of colour means the original colour is restored when the original temperature is restored.

The term "additive" refers to a composition for mixing with another composition, and in the present it results in a thermally colour-changeable ceramic coating composition.

The term "coating composition" refers to a composition capable of forming a coating.

The term "thermally colour-changeable ceramic coating composition", as used herein, refers to a coating composition having the formulation described herein.

The thermally colour-changeable ceramic coating composition is a liquid or gel that can be coated onto an artefact. The coating may be achieved using various coating methods known in the art such as but not limited to spray coating or dip coating.

The terms "coating" and "coating layer" may be used interchangeably and refer to a covering that is applied to and bound to at least part of (the surface of) an object, usually referred to as the substrate.

The term "thermally colour-changeable ceramic coating", as used herein, refers to the thermally colour-changeable ceramic coating composition described herein applied to an artefact. Typically, the thermally colour-changeable ceramic coating composition is cured so forming the thermally colour-changeable ceramic coating. The terms "% by weight" or "wt %" refer to weight percent compared with (i.e. relative to) the total weight.

The term "inorganic" refers to not composed of organic matter. Inorganic compounds are traditionally viewed as being synthesized by the agency of geological systems. In contrast, organic compounds are found in biological systems. Inorganic chemistry deals with molecules lacking carbon.

In certain embodiments, the thermally colour-changeable yellow inorganic pigment may be any thermally colour-changeable yellow inorganic agent or a combination of two or more, such as three or more, or four or more, thermally colour-changeable yellow inorganic agents capable of reversible thermally-induced temperature change.

The term "yellow" generally refers to the hue of that portion of the visible spectrum lying between orange and green, evoked in the human observer by radiant energy with wavelengths of approximately 571 to 590 nanometres; or to any of a group of colours of a hue resembling that of ripe lemons and varying in lightness and saturation.

The colour yellow encompasses different shades and intensities of the colour.

The term "pigment" refers to dry insoluble substance, usually an insoluble powder, to be suspended in a liquid vehicle such as water, oil or another base, to produce a paint, ink, and similar products.

Suitable non-limiting examples of thermally colour-changeable yellow inorganic agents include, for instance, an agent that contains niobium (Nb), tin (Sn), zinc (Zn), or titanium (Ti), or a mixture of these.

In certain embodiments of the inorganic thermochromic additive, thermally colour-changeable ceramic coating composition, the thermally colour-changeable ceramic coating, the kit, the coated artefact, or the uses, as taught herein, the thermally colour-changeable yellow inorganic pigment may be one or more metal pigments comprising niobium (Nb), tin (Sn), zinc (Zn), or titanium (Ti). In certain embodiments, the thermally colour-changeable yellow inorganic pigment may be one or more metal pigments, each metal pigment comprising one or more of niobium (Nb), tin (Sn), zinc (Zn), and titanium (Ti). The metal pigment may be a salt, an oxide, or a sulphide of the metal.

In certain embodiments, the thermally colour-changeable yellow inorganic pigment may be one or a mixture of two or more, such as a mixture of three or four, metal pigments comprising Nb, Sn, Zn, or Ti. The metal pigment may be a salt, an oxide, or a sulphide of the metal.

In certain embodiments, the thermally colour-changeable yellow inorganic pigment may be selected from the group consisting of Titanium Yellow (PY53), Mosaic gold or stannic sulfide ($SnS_2$). The CI number of the thermally colour-changeable yellow inorganic pigment is preferably Yellow 227.

In certain preferred embodiments, the thermally colour-changeable ceramic coating composition may comprise 15-24 wt %, or 15-20 wt % of a thermally colour-changeable yellow inorganic pigment, with wt % compared with the total weight of the thermally colour-changeable ceramic coating composition.

The thermally colour-changeable ceramic coating composition may comprise 1-20 wt %, or 2-20 wt % of a thermally colour-changeable yellow inorganic pigment, with wt % compared with the total weight of the thermally colour-changeable ceramic coating composition. For example, the thermally colour-changeable ceramic coating composition may comprise at least 2 wt %, at least 3 wt %, at least 4 wt %, at least 5 wt %, at least 6 wt %, at least 7 wt %, at least 8 wt %, at least 9 wt %, at least 10 wt % of a thermally colour-changeable yellow inorganic pigment, with wt % compared with the total weight of the thermally colour-changeable ceramic coating composition.

In certain embodiments, the thermally colour-changeable green inorganic pigment may be any green thermally colour-changeable green inorganic agent or a combination of two or more, such as three or more, for four or more, thermally colour-changeable green inorganic agents capable of reversible thermally-induced temperature change.

The term "green" generally refers to the hue of that portion of the visible spectrum lying between yellow and blue, evoked in the human observer by radiant energy with wavelengths of approximately 490 to 570 nanometers; or to any of a group of colours that may vary in lightness and saturation and whose hue is that of the emerald.

The colour green encompasses different shades and intensities of the colour.

Suitable non-limiting examples of a thermally colour-changeable green inorganic pigment include one that contains iron. The iron pigment may be a salt, an oxide, or a sulphate of iron, preferably iron oxide. The iron preferably has a valency of 2. The CI number of the thermally colour-changeable yellow inorganic pigment is preferably Green 17.

In certain embodiments of the inorganic thermochromic additive, the thermally colour-changeable ceramic coating composition, the thermally colour-changeable ceramic coating, the kit, the coated artefact, or the uses, as taught herein, the thermally colour-changeable green inorganic pigment may be an iron oxide pigment.

In a preferred embodiment, the thermally colour-changeable ceramic coating composition may comprise 1-6 wt %, or 1-5 wt % of a thermally colour-changeable green inorganic pigment, with wt % compared with the total weight of the thermally colour-changeable ceramic coating composition.

The thermally colour-changeable ceramic coating composition may comprise 0-3 wt % of a thermally colour-changeable green inorganic pigment, with wt % compared with the total weight of the thermally colour-changeable ceramic coating composition. The thermally colour-changeable ceramic coating composition may comprise 1-3 wt % of the thermally colour-changeable green inorganic pigment, with wt % compared with the total weight of the thermally colour-changeable ceramic coating composition.

In certain embodiments, the white inorganic pigment may be any white inorganic agent or a combination of two or more, such as three or more, or four or more, white inorganic agents.

In certain embodiments, the white inorganic pigment may be non-thermally colour-changeable.

The term "white" generally refers to a colour without hue at one extreme end of the scale of grays, opposite to black; or to the colour produced by the combination of all the colours of the visible spectrum. A white surface reflects light of all hues completely and diffusely.

The colour white encompasses different shades and intensities of the colour.

Suitable non-limiting examples of a white inorganic pigment include an agent that contains zinc (Zn) or titanium (Ti). The agent may contain a salt, an oxide, or a sulphide of the zinc (Zn) or titanium (Ti). According to a preferred aspect, the white inorganic pigment comprises one or more, preferably all of titanium dioxide, silicon dioxide, aluminium hydroxide, and zirconium oxide. According to a more preferred aspect, the white inorganic pigment comprises titanium dioxide 86-97%, silicon dioxide 10-20%, aluminium hydroxide 0-10%, and zirconium oxide 0-2%.

In certain embodiments of the inorganic thermochromic additive, the thermally colour-changeable ceramic coating composition, the thermally colour-changeable ceramic coating, the kit, the coated artefact, or the uses, as taught herein, the white inorganic pigment comprises one or more, preferably all of titanium dioxide, silicon dioxide, aluminium hydroxide, and zirconium oxide. According to a more preferred aspect, the white inorganic pigment comprises titanium dioxide 86-97%, silicon dioxide 10-20%, aluminium hydroxide 0-10%, and zirconium oxide 0-2%.

In certain embodiments, the white inorganic pigment may be selected from the group consisting of Ti-Pure titanium dioxide white inorganic pigment (DuPont™), (titanium dioxide) Millennium Inorganic Chemicals.

In a preferred embodiment, the thermally colour-changeable ceramic coating composition may comprise 0-9 wt % of the white inorganic pigment, with wt % compared with the total weight of the thermally colour-changeable ceramic coating composition.

The thermally colour-changeable ceramic coating composition may comprise 0-25 wt %, or 2-25 wt % of the white inorganic pigment, with wt % compared with the total weight of the thermally colour-changeable ceramic coating composition.

The inorganic ceramic coating composition may be any which is inorganic, and preferably containing silica, though it may be based on a different metal, such as zirconium (forming zirconia ceramic). Inorganic ceramic coatings are well known in the art and include temperature-resistive coatings, non-stick coatings, as well as the coatings described herein. Typically, a non-stick inorganic ceramic coating composition contains a silane, more preferred, an alkoxysilane, or an oligomer thereof as set out below.

The thermally colour-changeable ceramic coating composition as taught herein may comprise 68-80 wt %, preferably 70-80 wt % of the inorganic ceramic coating composition. In certain embodiments of the thermally colour-changeable ceramic coating composition, the kit, the coated artefact, or the uses, as taught herein, the inorganic ceramic coating composition may comprise (a) 6-25 wt % of a silane or an oligomer thereof as a binder; (b) 25-60 wt % of a silica mixture; (c) 0-10 wt % of a mixture comprising a functional filler and/or a ceramic powder that emits far infrared radiation and anions, with wt % compared with the total weight of the inorganic ceramic coating composition. The balance of the inorganic ceramic coating composition preferably contains an alcohol such as methanol, ethanol or isopropyl alcohol. In a preferred embodiment, component (c) is 0-10 wt % of a mixture comprising a functional filler and a ceramic powder that emits far infrared radiation and anions. In a preferred embodiment, component (c) is 0-10 wt % of a mixture comprising a functional filler and a ceramic powder comprising a far-infrared radiation emitting material and an anion-emitting material.

In certain embodiments, the inorganic ceramic coating composition may comprise;
(a) 6-25 wt % of a silane or an oligomer derived thereof as a binder;
(b) 25-60 wt % of a silica mixture which is bound to the binder silane or oligomer derived therefrom by a chemical reaction and which is composed of 20-40 wt % of silicon dioxide ($SiO_2$) powder having a particle size of 0.2-1.0 μm and 60-80 wt % of water;
(c) 0-10 wt % of:
  a functional filler composed of at least one natural mineral materials selected from the group consisting of quartz, monzonite, gneiss and rhyolitic tuff, the functional filler functioning to prevent cracking between the binder and the silica mixture in a coating layer formed of the composition and to control the viscosity of the composition in order to improve the physical and chemical properties of the coating layer;
  and/or
  a ceramic powder that emits far infrared radiation and anions composed of a far-infrared radiation emitting material, which comprises at least one natural ore material selected from the group consisting of tourmaline, loess, sericite, amethyst, raw ore, bamboo charcoal, Uiwangseok (natural ore), obsidian and elvan; and an anion-emitting material comprising at least one element selected from the group consisting of strontium, vanadium, zirconium, cerium, neodymium, lanthanum, barium, rubidium, cesium and gallium,
with wt % compared with the total weight of the inorganic ceramic coating composition.

The silane or an oligomer derived thereof as a binder may be a liquid. In certain embodiments, the silane or oligomer thereof may be an alkoxysilane or an oligomer thereof. The silane or an oligomer derived thereof may be provided in alcohol; the % wt of silane or an oligomer still refers to the % wt of silane or an oligomer derived thereof present in the inorganic ceramic coating composition and not to the % wt of the alcohol solution thereof. The alcohol may be, for instance, methanol, ethanol, or iso-propyl alcohol. The silane or oligomer derived thereof may be present in the alcohol at 20 wt %, 30 wt %, 40 wt %, 50 wt % compared with the total weight of the alcohol solution.

In certain embodiments, the silane may be at least one compound selected from the group consisting of methyltrimethoxysilane, ethyltrimethoxysilane, normalpropyltrimethoxysilane, phenyltrimethoxysilane, vinyltrimethoxysilane, methyltriethoxysilane, ethyltriethoxysilane, normalpropyltriethoxysilane, phenylriethoxysilane, vinyltriethoxysilane, trifluoropropyltrimethoxysilane, tridecafluorooctyltrimethoxysilane, tetraethoxysilane, and heptadecafluorodecyltrimethoxysilane.

In certain embodiments, the silane or oligomer thereof may be at least one compound selected from the group consisting of methyltrimethoxysilane, ethyltrimethoxysilane, normalpropyltrimethoxysilane, phenyltrimethoxysilane, vinyltrimethoxysilane, methyltriethoxysilane, ethyltriethoxysilane, normalpropyltriethoxysilane, phenylriethoxysilane, vinyltriethoxysilane, trifluoropropyltrimethoxysilane, tridecafluorooctyltrimethoxysilane, tetraethoxysilane, and heptadecafluorodecyltrimethoxysilane, or an oligomer thereof.

In certain embodiments, the silane or oligomer thereof may be methyltrimethoxysilane (MTMS) or an oligomer thereof.

In certain embodiments, the silane may have a formula $R_n SiX_{4-n}$ or an oligomer thereof, wherein
each X is the same or different, and is selected from a hydrolysable group or a hydroxyl group,
R is the same or different, and is selected from hydrogen or an alkyl group having less than 10 carbon atoms, and
n is 0, 1, or 2.

In certain embodiments, the hydrolysable groups may be an alkoxy moiety such as methoxy or ethoxy. Such methoxy or ethoxy groups advantageously react with the various forms of hydroxyl groups.

As used herein, the term "alkyl group" refers to a hydrocarbon group of Formula $C_n H_{2n+1}$ wherein n is a number of at least 1. Alkyl groups may be linear, or branched and may be substituted as indicated herein.

The alkyl groups may comprise from 1 to 10 carbon atoms, preferably from 1 to 6 carbon atoms, more preferably 1, 2, 3, 4, 5, 6 carbon atoms. When a subscript is used herein following a carbon atom, the subscript refers to the number of carbon atoms that the named group may contain. For example, the term "alkyl group having less than 10 carbon atoms", as a group or part of a group, refers to a hydrocarbon group of Formula $C_n H2_{n+1}$ wherein n is a number ranging from 1 to 10. For example, an alkyl group having less than 10 carbon atoms includes all linear, or branched alkyl groups having 1 to 10 carbon atoms, and thus includes for example methyl, ethyl, n-propyl, i-propyl, 2-methyl-ethyl, butyl and its isomers (e.g. n-butyl, i-butyl and t-butyl); pentyl and its isomers, hexyl and its isomers, heptyl and its isomers, octyl and its isomers, nonyl and its isomers, and decyl and its isomers, undecyl and its isomers, dodecyl and its isomers, tridecyl and its isomers, tetradecyl and its isomers, pentadecyl and its isomers, hexadecyl and its isomers, heptadecyl and its isomers, octadecyl and its isomers, nonadecyl and its isomers, icosyl and its isomers, henicosyl and its isomers, docosyl and its isomers, tricosyl and its isomers, tetracosyl and its isomers, pentacosyl and its isomers, and the like.

If the content of the binder is out of the above-specified range, delamination of a coating layer formed of the thermally colour-changeable ceramic coating composition as taught herein can occur.

In certain embodiments of the thermally colour-changeable ceramic coating composition, the thermally colour-changeable ceramic coating composition, the kit, the coated artefact, or the uses, as taught herein, the silica mixture is bound to the silane or to the oligomer thereof by a chemical reaction. Typically it binds as the inorganic ceramic coating composition starts to mature.

In certain embodiments of the thermally colour-changeable ceramic coating composition, the thermally colour-changeable ceramic coating composition, the kit, the coated artefact, or the uses, as taught herein, the silica mixture contains 25-60 wt % of silicon dioxide ($SiO_2$) as a powder or colloid. The remainder of the silica mix may comprise water, optionally combined with an alcohol, such as methanol, ethanol or isopropyl alcohol. The $SiO_2$ preferably has a particle size of 0.2-1.0 μm. The $SiO_2$ preferably contains 60-80 wt % of water, with wt % compared with the total weight of the silica mixture. If the particle size and content of the silica mixture are out of the above-specified ranges, the silica mixture cannot sufficiently react with the binder silane or oligomer thereof.

In certain embodiments of the thermally colour-changeable ceramic coating composition, the thermally colour-changeable ceramic coating composition, the kit, the coated artefact, or the uses, as taught herein, may contain a functional filler. The functional filler may be a powder. The functional filler as defined herein may be potassium titanate, alumina or the like. The functional filler as defined herein may be composed of needle-shaped or sheet-shaped particles. The mean particle size may be 5 μm, 10 μm, 20 μm, 25 μm, or a value in a range between any two of the aforementioned values, preferably between 5 μm and 20 μm, preferably equal to or less than 20 μm. The functional filler as defined herein functions to prevent cracking between the binder and the silica mixture in a coating layer formed of the inorganic ceramic coating composition as taught herein and/or to control the viscosity of the inorganic ceramic coating composition as taught herein. If the content of the functional filler as defined herein is less than 10 wt %, the gloss or adhesion of the coating layer can be reduced. If the content of the functional filler as defined herein is more than 19 wt %, the surface of the coating layer will become rough.

In certain embodiments, the functional filler may comprise at least one natural mineral material selected from the group consisting of quartz, monzonite, gneiss and rhyolitic tuff.

In certain embodiments of the thermally colour-changeable ceramic coating composition, the thermally colour-changeable ceramic coating composition, the kit, the coated artefact, or the uses, as taught herein may comprise the ceramic powder.

The mean particle size of the ceramic powder may be 2 μm, 4 μm, 6 μm, 8 μm, or 10 μm, or a value in a range between any two of the aforementioned values, preferably equal to or less than 10 μm.

The ceramic powder emits far-infrared (IR) radiation together with anions. The ceramic powder may comprise a material that emits both far IR rays and anions, or a mixture of materials that separately emit far IR radiation and anions. The ceramic powder may comprise a far infrared radiation emitting material and an anion-emitting material.

The far-infrared radiation-emitting material may be a ceramic material comprising at least one selected from a group of natural mineral materials (tourmaline, loess, sericite, amethyst, raw ore, bamboo charcoal, Uiwangseok (natural ore), obsidian and elvan) such as quartz, monzonite, gneiss and rhyolitic tuff, which show a far-infrared emissivity of 90% or higher at a temperature of 40° C., and the anion emitting material may be comprise at least one element selected from the group of strontium, vanadium, zirconium, cerium, neodymium, lanthanum, barium, rubidium, cesium and gallium. In certain embodiments of the thermally colour-changeable ceramic coating composition, the kit, or the uses, as taught herein, the far-infrared radiation emitting material and the anion-emitting material may be mixed at a weight ratio of 1:1.

The far-infrared radiation-emitting material as defined herein may be any ceramic material which shows a far-infrared emission rate of 90% or higher, at a temperature of 40° C. Far-infrared emissions have a wavelength of 15 μm to 1 mm. Far-infrared emissions may be tested using KICM-FIR-1005 (based on JIS-R-1801) by using FT-IR.

In certain embodiments, the far-infrared radiation emitting material may comprise at least one natural ore material selected from the group consisting of tourmaline, loess, sericite, amethyst, raw ore, bamboo charcoal, Uiwangseok (natural ore), obsidian, elvan, yellow ocher, Sanggwangsuk, kiyoseki, Kwangmyeongsuk, and lava. It is noted that most natural ceramic mineral materials also emit anions.

The anion-emitting material as defined herein may be any material which emits an anion. The presence of anion emissions may be tested using JIS-B-9929.

In certain embodiments, the anion-emitting material may be an element. The element comprise at least one element selected from the group consisting of strontium, vanadium, zirconium, cerium, neodymium, lanthanum, barium, rubidium, cesium, and gallium. Such anion-emitting materials are known to emit anions and far-infrared rays.

In certain embodiments of the thermally colour-changeable ceramic coating composition, the thermally colour-changeable ceramic coating composition, the kit, or the uses, as taught herein, the far-infrared radiation-emitting material and the anion-emitting material may be mixed at a weight ratio of 1:1, wherein the far-infrared radiation-emitting material may comprise at least one natural ore material selected from the group consisting of tourmaline, loess, sericite, amethyst, raw ore, bamboo charcoal, Uiwangseok (natural ore), obsidian, elvan, yellow ocher, Sanggwangsuk, kiyoseki, Kwangmyeongsuk, and lava; and the anion-emitting material may comprise at least one element selected from the group consisting of strontium, vanadium, zirconium, cerium, neodymium, lanthanum, barium, rubidium, cesium, and gallium.

Another aspect of the invention relates to a use of inorganic thermochromic additive for preparation of a thermally colour-changeable ceramic coating composition. The use may involve the step of adding the inorganic thermochromic additive to the inorganic ceramic coating composition.

In certain embodiments, the colour change of the thermally colour-changeable ceramic coating as taught herein may be visually observed. The colour change of the thermally colour-changeable ceramic coating as taught herein may be visually observed with the naked eye.

In certain embodiments, the colour change of the thermally colour-changeable ceramic coating as taught herein may be visually detected in comparison with the colour of a non-thermally colour-changeable ceramic coating having the same colour as the thermally colour-changeable ceramic coating as taught herein, for instance in comparison with the colour of an inorganic ceramic coating having the same colour as the thermally colour-changeable ceramic coating as taught herein. In certain embodiments, the colour change of the thermally colour-changeable ceramic coating as taught herein may be visually detected in comparison with the colour of the thermally colour-changeable ceramic coating as taught herein coated on a non-heated or insulated part of the artefact, for instance in comparison with the colour of the thermally colour-changeable ceramic coating as taught herein coated on the handle of the cookware such as on the handle of a frying pan, or in comparison with the exterior of the cookware, or in comparison with the lid.

In certain embodiments, the colour change of the thermally colour-changeable ceramic coating as taught herein may be detected by using a Colour Analyser, such as the TES-135 manufactured by TES Electrical Electronics Corp (TW). The analyser provides an numeric output of ΔE—the difference between two colours. The value ΔE is well understood in the art of colour difference, as described, for instance at http://en.wikipedia.org/wiki/Color_difference.

In certain embodiments, the colour change of the thermally colour-changeable ceramic coating as taught herein may be visually detected by reference to a colour (reference) chart.

In certain embodiments, the colour change can be measured using, for instance, by a colour light probe, or by comparing with a Pantone colour code.

In certain embodiments, the colour change can be described using the RAL colour standard, Pantone Matching System (PMS), the Munsell colour system, or a combination thereof.

The RAL colour standard, the Pantone Matching System (PMS), and the Munsell colour system are all known in the art.

The term "RAL colour standard" generally refers to a colour matching system used in Europe.

The term "Pantone Matching System" generally refers to a largely standardized colour reproduction system.

The term "Munsell colour system" refers to is a colour space that specifies colours based on three colour dimensions: hue, value (lightness), and chroma (colour purity).

In certain embodiments, the colour change can be described using RAL colours. In certain embodiments, the colour change can be described by a change from one RAL colour to another RAL colour. The RAL colour may be RAL 1000 (Green beige), RAL 1001 (Beige), RAL 1002 (Sand yellow), RAL 1003 (Signal yellow), RAL 1004 (Golden yellow), RAL 1005 (Honey yellow), RAL 1006 (Corn yellow), RAL 1007 (Daffodil yellow), RAL 1011 (Brown beige), RAL 1012 (Lemon yellow), RAL 1013 (Oyster white), RAL 1014 (Ivory), RAL 1015 (Light ivory), RAL 1016 (Sulfur yellow), RAL 1017 (Saffron yellow), RAL 1018 (Zinc yellow), RAL 1019 (Grey beige), RAL 1020 (Olive yellow), RAL 1021 (Rapeseed yellow), RAL 1023 (traffic yellow), RAL 1024 (Ochre yellow), RAL 1026 (Luminous yellow), RAL 1027 (Curry yellow), RAL 1028 (Melon yellow), RAL 1032 (Broom yellow), RAL 1033 (Dahlia yellow), RAL 1034 (Pastel yellow), RAL 1035 (Pearl beige), RAL 1036 (Pearl gold), RAL 1037 (Sun yellow), RAL 2000 (Yellow orange), RAL 2001 (Red orange), RAL 2002 (Vermillion), RAL 2003 (Pastel orange), RAL 2004 (Pure orange), RAL 2005 (Luminous orange), RAL 2007 (Luminous bright orange), RAL 2008 (Bright red orange), RAL 2009 (traffic orange), RAL 2010 (Signal orange), RAL 2011 (Deep orange), RAL 2012 (Salmon orange), RAL 2013 (Pearl orange), RAL 3000 (Flame red), RAL 3001 (Signal red), RAL 3002 (Carmine red), RAL 3003 (Ruby red), RAL 3004 (Purple red), RAL 3005 (Wine red), RAL 3007 (Black red), RAL 3009 (Oxide red), RAL 3011 (Brown red), RAL 3012 (Beige red), RAL 3013 (Tomato red), RAL 3014 (Antique pink), RAL 3015 (Light pink), RAL 3016 (Coral red), RAL 3017 (Rose), RAL 3018 (Strawberry red), RAL 3020 (traffic red), RAL 3022 (Salmon pink), RAL 3024 (Luminous red), RAL 3026 (Luminous bright red), RAL 3027 (Raspberry red), RAL 3028 (Pure red), RAL 3031 (Orient red), RAL 3032 (Pearl ruby red), RAL 3033 (Pearl pink), RAL 4001 (Red lilac), RAL 4002 (Red violet), RAL 4003 (Heather violet), RAL 4004 (Claret violet), RAL 4005 (Blue lilac), RAL 4006 (Traffic purple), RAL 4007 (Purple violet), RAL 4008 (Signal violet), RAL 4009 (Pastel violet), RAL 4010 (Telemagenta), RAL 4011 (Pearl violet), RAL 4012 (Pearl blackberry), RAL 5000 (Violet blue), RAL 5001 (Green blue), RAL 5002 (Ultramarine blue), RAL 5003 (Sapphire blue), RAL 5004 (Black blue), RAL 5005 (Signal blue), RAL 5007 (Brilliant blue), RAL 5008 (Grey blue), RAL 5009 (Azure blue), RAL 5010 (Gentian blue), RAL 5011 (Steel blue), RAL 5012 (Light blue), RAL 5013 (Cobalt blue), RAL 5014 (Pigeon blue), RAL 5015 (Sky blue), RAL 5017 (traffic blue), RAL 5018 (Turquoise blue), RAL 5019 (Capri blue), RAL 5020 (Ocean blue), RAL 5021 (Water blue), RAL 5022 (Night blue), RAL 5023 (Distant blue), RAL 5024 (Pastel blue), RAL 5025 (Pearl Gentian blue), RAL 5026 (Pearl night blue), RAL 6000 (Patina green), RAL 6001 (Emerald green), RAL 6002 (Leaf green), RAL 6003 (olive green), RAL 6004 (Blue green), RAL 6005 (Moss green), RAL 6006 (Grey olive), RAL 6007 (Bottle green), RAL 6008 (Brown green), RAL 6009 (Fir green), RAL 6010 (Grass green), RAL 6011 (Reseda green), RAL 6012 (Black green), RAL 6013 (Reed green), RAL 6014 (Yellow olive), RAL 6015 (Black olive), RAL 6016 (Turquoise green), RAL 6017 (May green), RAL 6018 (Yellow green), RAL 6019 (pastel green), RAL 6020 (Chrome green), RAL 6021 (Pale green), RAL 6022 (Brown olive), RAL 6024 (Traffic green), RAL 6025 (Fern green), RAL 6026 (Opal green), RAL 6027 (Light green), RAL 6028 (Pine green), RAL 6029 (Mint green), RAL 6032 (Signal green), RAL 6033 (Mint turquoise), RAL 6034 (Pastel turquoise), RAL 6035 (Pearl green), RAL 6036 (Pearl opal green), RAL 6037 (Pure green), RAL 6038 (Luminous green), RAL 7000 (Squirrel grey), RAL 7001 (Silver grey), RAL 7002 (Olive grey), RAL 7003 (Moss grey), RAL 7004 (Signal grey), RAL 7005 (Mouse grey), RAL 7006 (Beige grey), RAL 7008 (Khaki grey), RAL 7009 (Green grey), RAL 7010 (Tarpaulin grey), RAL 7011 (Iron grey), RAL 7012 (Basalt grey), RAL 7013 (Brown grey), RAL 7015 (Slate grey), RAL 7016 (Anthracite grey), RAL 7021 (Black grey), RAL 7022 (Umbra grey), RAL 7023 (Concrete grey), RAL 7024 (Graphite grey), RAL 7026 (Granite grey), RAL 7030 (Stone grey), RAL 7031 (Blue grey), RAL 7032 (Pebble grey), RAL 7033 (Cement grey), RAL 7034 (Yellow grey), RAL 7035 (Light grey), RAL 7036 (Platinum grey), RAL 7037 (Dusty grey), RAL 7038 (Agate grey), RAL 7039 (Quartz grey), RAL 7040 (Window grey), RAL 7042 (Traffic grey A), RAL 7043 (Traffic grey B), RAL 7044 (Silk grey), RAL 7045 (Telegrey 1), RAL 7046 (Telegrey 2), RAL 7047 (Telegrey 4), RAL 7048 (Pearl mouse grey), RAL 8000 (Green brown), RAL 8001 (Ochre brown), RAL 8002 (Signal brown), RAL 8003 (Clay brown), RAL 8004 (Copper brown), RAL 8007 (Fawn brown), RAL 8008 (Olive brown), RAL 8011 (Nut brown), RAL 8012 (Red brown), RAL 8014 (Sepia brown), RAL 8015 (Chestnut brown), RAL 8016 (Mahogany brown), RAL 8017 (Chocolate brown), RAL 8019 (Grey brown), RAL 8022 (Black brown), RAL 8023 (Orange brown), RAL 8024 (Beige brown), RAL 8025 (Pale brown), RAL 8028 (Terra brown), RAL 8029 (Pearl copper), RAL 9001 (Cream), RAL 9002 (Grey white), RAL 9003 (Signal white), RAL 9004 (Signal black), RAL 9005 (Jet black), RAL 9006 (White aluminium), RAL 9007 (Grey aluminium), RAL 9010 (Pure white), RAL 9011 (Graphite black), RAL 9016 (Traffic white), RAL 9017 (Traffic black), RAL 9018 (Papyrus white), RAL 9022 (Pearl light grey), or RAL 9023 (Pearl dark grey).

In certain embodiments, the colour change can be described using Pantone colours. In certain embodiments, the colour change can be described by a change from one Pantone colour to another Pantone colour. The Pantone colour may be as known in the art.

A third aspect relates to a thermally colour-changeable ceramic coating prepared from the inorganic thermochromic additive and thermally colour-changeable ceramic coating composition as taught herein.

In certain embodiments, the present invention relates to a thermally colour-changeable ceramic coating applied to and bound to (the surface of) an artefact, wherein the thermally colour-changeable ceramic coating is prepared from the thermally colour-changeable ceramic coating composition as taught herein, typically by a curing step.

In certain embodiments, the thermally colour-changeable ceramic coating as taught herein may be decorative, functional, or both. The thermally colour-changeable ceramic coating as taught herein may be an all-over coating, i.e., completely covering the artefact, or it may only cover parts of the artefact.

The thermally colour-changeable ceramic coating may comprise 40-60% inorganic thermochromic additive and 40-60% inorganic ceramic coating.

The thermally colour-changeable ceramic coating may comprise 40-60% inorganic thermochromic additive; 0-20% mixture comprising a functional filler and/or a ceramic powder that emits far infrared radiation and anions; and 20-60% reacted silica mixture and silane or an oligomer thereof.

The thermally colour-changeable ceramic coating may comprise 40-60% white inorganic pigment, thermally colour-changeable yellow inorganic pigment, and thermally colour-changeable green inorganic pigment; 0-20% mixture comprising a functional filler and/or a ceramic powder that emits far infrared radiation and anions; and 20-60% reacted silica mixture and silane or an oligomer thereof.

A further aspect relates to the use of the thermally colour-changeable ceramic coating composition as taught herein for coating an artefact, in particular an item of cookware.

The thermally colour-changeable ceramic coating composition as taught herein can provide various coating structures such as a one-layer coating structure or a two-layer coating structure. A two-layer coating structure may consist of a general transparent coating layer formed on a thermally colour-changeable ceramic coating layer as taught herein.

The thermally colour-changeable ceramic coating composition as taught herein can be used for coating may different artefacts, for instance, a wood-burning-stove, a heating boiler, a heater in general, an clothes iron, a health aid, a building material, a hair care product such as a hair straightener or a curling iron, and an industrial products. In particular, the artefacts may be a cookware item, specifically, a pot or pans for the oven or stove-top.

In an embodiment, an inorganic ceramic coating composition devoid of the thermochromic inorganic additive and optionally having the same colour as a thermally colour-changeable ceramic coating composition as taught herein at room temperature may be applied to the exterior surface, and the thermally colour-changeable ceramic coating composition as taught herein may be applied to the interior surface (i.e. cooking surface), so that the change in colour of the interior surface compared with the colour of the exterior surface can be easily seen by the user. In another embodiment, the thermally colour-changeable ceramic coating composition as taught herein may be applied to the handle and the interior surface, so that the change in colour of the interior surface compared to the handle can be easily seen by the user.

In certain embodiments, the use of the thermally colour-changeable ceramic coating composition as taught herein is for all-over coating the cookware, i.e., completely covering the cookware. In certain embodiments, the use of the thermally colour-changeable ceramic coating composition as taught herein is for coating parts of the cookware. In certain embodiments, the use of the thermally colour-changeable ceramic coating composition as taught herein is for coating the interior surface, the exterior surface, and/or the handle of the cookware.

In certain embodiments, the use of the thermally colour-changeable ceramic coating composition as taught herein is for coating the interior surface of the cookware. In certain embodiments, the use of the thermally colour-changeable ceramic coating composition as taught herein is for coating the interior surface and the exterior surface of the cookware. In certain embodiments, the use of the thermally colour-changeable ceramic coating composition as taught herein is for coating the interior surface, the exterior surface, and the handle of the cookware. In certain embodiments, the use of the thermally colour-changeable ceramic coating composition as taught herein is for coating parts of the cookware such as the interior surface and the handle of the cookware. Coating only the interior surface of the cookware, or coating the interior surface and the handle of the cookware with the thermally colour-changeable ceramic coating composition as taught herein advantageously allows to easily visually detect the colour change in comparison with the colour of a non-thermally colour-changeable ceramic coating, for instance coated on the exterior surface or handle of the cookware, or in comparison with the colour of a thermally colour-changeable ceramic coating as taught herein coated on a non-heated or insulated part of an artefact, for instance in comparison with the colour of a thermally colour-changeable ceramic coating as taught herein coated on the handle of the cookware.

The thermally colour-changeable ceramic coating as taught herein may be applied in a thickness suited to its application.

In certain embodiments, the thermally colour-changeable ceramic coating composition as described herein is preferably coated on cooking utensils such as frying pans to a thickness of 20-60 μm. If the thickness of the thermally colour-changeable ceramic coating layer is less than 20 μm, the sintering density of the coating layer can be limited, and thus the mechanical properties such as durability and abrasion resistance and the chemical properties such as corrosion resistance of the coating layer can be reduced. If the thickness of the coating layer is more than 60 μm, the mechanical and chemical properties of the coating layer will be improved, but the effects of the increase in the thickness will be insignificant.

In certain embodiments, the present invention relates to a method for coating an artefact, in particular an item of cookware with a thermally colour-changeable ceramic coating composition as taught herein.

The thermally colour-changeable ceramic coating composition as taught herein can be coated using various coating methods known in the art such as spray coating or dip coating.

In certain embodiments, coating an artefact, such as an item of cookware, may be performed by methods as known in the art.

In certain embodiments, a method for coating an artefact such as an item cookware may comprise the step of spraying the thermally colour-changeable ceramic coating composition as taught herein on a surface of the artefact, such as a cookware. In certain embodiments, spraying the thermally colour-changeable ceramic coating composition as taught herein may be performed using a spray gun such as an air-assisted spray gun. In certain embodiments, spraying the thermally colour-changeable ceramic coating composition as taught herein may be performed manually or automatically.

In certain embodiments, a method for coating an artefact such as a cookware item may comprise the steps of:
  providing a first solution comprising a silica mixture, a functional filler, a ceramic powder that emits far-infrared ray-radiation and anions, a white inorganic pigment, a thermally colour-changeable yellow inorganic pigment, and a thermally colour-changeable green inorganic pigment in a first container;
  providing a second solution comprising silane or an oligomer thereof as a binder in a second container;
  pre-rolling the first solution in the first container and the second solution in the second container;
  mixing the first solution and the second solution, thereby obtaining the thermally colour-changeable ceramic coating composition as taught herein;
  vigorously shaking the thermally colour-changeable ceramic coating composition as taught herein;
  maturing the thermally colour-changeable ceramic coating composition as taught herein;
  filtering the thermally colour-changeable ceramic coating composition as taught herein;
  spraying the thermally colour-changeable ceramic coating composition as taught herein on a surface of the artefact; and
  curing the thermally colour-changeable ceramic coating composition as taught herein, thereby obtaining the thermally colour-changeable ceramic coating as taught herein on the artefact.

The term "maturing", as used herein, refers to bringing the chemical reactions (e.g. acid catalysed silane oligomer formation, reaction between the silica mixture and the silane or oligomer derived thereof) in the thermally colour-changeable ceramic coating composition to completion.

The term "curing", as used herein, refers to heating the thermally colour-changeable ceramic coating applied to at least part of (the surface of) an artefact, to solidify the thermally colour-changeable ceramic coating and bind it to at least part of (the surface of) the artefact. After curing, the adhesion of the thermally colour-changeable ceramic coating as taught herein to the artefact surface, for instance a cookware, is mainly mechanical although there may be some chemical bonding involved.

The quantities of components in the first and second solution are such that the first and second solutions when mixed form the thermally colour-changeable ceramic coating composition as described herein. An acid (e.g. hydrochloric acid; formic acid; sulfuric acid; acetic acid; nitric acid), in a catalytic amount (less than 1 wt % of the thermally colour-changeable ceramic coating composition) may be additionally provided in the first and/or second solutions or added separately.

The thermally colour-changeable ceramic coating composition may be provided as a first solution comprising a silica mixture, a functional filler, a ceramic powder that emits far-infrared ray-radiation and anions, a white inorganic pigment, a thermally colour-changeable yellow inorganic pigment, and a thermally colour-changeable green inorganic pigment; and a second solution comprising a silane or an oligomer thereof as a binder.

Prior to the step of pre-rolling the first solution and the second solution, the method may comprise checking whether any deposits adhere to the base of the container comprising the first solution and/or the container comprising the second solution. Any such deposits may be broken down and evenly suspended in the solution before mixing.

If deposits adhere to the inside of the container, the base may be tapped with a rubber mallet and then the container shaken vigorously. This may be repeated until the deposits are fully dispersed and are no longer visible.

The step of pre-rolling the first solution and the second solution may be performed by rolling the first and second solutions in separate containers on a roller for at least 60 min. The rolling may be performed at a speed of 80-100 rpm and temperature of 20-30° C.

The step of mixing the first solution and the second solution may be performed by adding the second solution to the first solution. The thermally colour-changeable ceramic coating composition as taught herein may contain 30-50 wt % (e.g. 35 wt %) of the second solution and 70-50 wt % (e.g. 65 wt %) of the first solution, depending on the concentration of components in the respective solutions.

The step of vigorously shaking the thermally colour-changeable ceramic coating composition as taught herein may be performed immediately after mixing the first solution and the second solution. The step of maturing the thermally colour-changeable ceramic coating composition as taught herein may be performed without any delay after the step of vigorously shaking the thermally colour-changeable ceramic coating composition as taught herein. This allows obtaining a high quality coating.

There may be some variations in the maturing conditions (e.g. maturing time and temperature of mixing).

The step of maturing the thermally colour-changeable ceramic coating composition as taught herein may be performed by rolling the thermally colour-changeable ceramic coating composition as taught herein at a speed of 80-100 rpm, at an air temperature of 40±2° C. Maturing times may be about 3 hours but may vary according to the working environment.

Alternatively, the step of maturing the thermally colour-changeable ceramic coating composition as taught herein may be performed by rolling the thermally colour-changeable ceramic coating composition as taught herein for 24 hours at room temperature.

The step of maturing the thermally colour-changeable ceramic coating composition as taught herein may be checked by a maturity check. For instance, to check whether the thermally colour-changeable ceramic coating is sufficiently matured, the coating may be sprayed onto a plate, for example a sandblasted aluminium plate, and then baked, for example for 10 minutes at 60-80° C. Good appearance and gloss levels (i.e. when compared with a control standard) may indicate that maturing is complete. Alternatively, if craters are seen in the coating, or there appears to be insufficient gloss, maturing may not be sufficient. If the coating is found to be under-matured (i.e. low gloss and/or craters) then the container with the thermally colour-changeable ceramic coating composition as taught herein may need to be returned to the rollers for a further period of 30 minutes at a speed of 80-100 rpm.

The step of filtering the thermally colour-changeable ceramic coating composition as taught herein is important to prevent clogging of the spray gun and for a smooth finish.

The step of filtering the thermally colour-changeable ceramic coating composition as taught herein may be performed with a filter mesh size of 300 to 400.

The step of spraying the thermally colour-changeable ceramic coating composition as taught herein may be performed using a spray gun such as an air-assisted spray gun. The nozzle diameter may be 1.0 to 1.3 mm. The air pressure may be 2 to 6 bar, depending on the spray gun type. The artefact surface temperature may be 45±10° C., as measured by using a contact thermometer.

The step of spraying the thermally colour-changeable ceramic coating composition as taught herein may be performed in a coating booth, preferably at a temperature of 20-30° C. and with a relative humidity of less than 70%. In certain embodiments, spraying may be performed manually or automatically.

In certain embodiments, adhesion to the artefact surface, preferably metal surface, may be promoted by grit-blasting the surface, preferably metal surface, to create a rough profile of peaks and troughs (i.e., an anchor pattern). The momentum of the atomised coating from the spray gun creates flow at the surface, preferably metal surface, thus causing coating to flow into the rough profile.

The artefact surface may be pre-treated before the spraying step.

Pre-treatment of the artefact surface before the spraying (i.e., coating) step may involve de-greasing the artefact surface, preferably by solvent or alkali wash.

Pre-treatment of the artefact surface before the spraying (i.e., coating) step may involve sand blasting the substrate, preferably by Alumina shot. The particle size may be 60 to 80 mesh. The blasting pressure may be 5 to 7 bar. The depth of blast layer (Ra value) may be 2.5 to 3.5 μm (for an aluminum substrate), or 2.5 to 3.0 μm (for an SUS stainless steel artefact surface).

Pre-treatment of the artefact surface before the spraying (i.e., coating) step may involve cleaning the artefact surface for instance by blasting with clean/dry air, preferably at a pressure of 5 to 7 bar, to remove dust and particles.

Pre-treatment of the artefact surface before the spraying (i.e., coating) step may optionally involve hard anodization of the artefact surface.

Pre-treatment of the artefact surface before the spraying (i.e., coating) step may involve dehumidifying of the artefact surface, for instance by pre-heating to peak temperature 60-70° C. immediately prior to spraying.

The step of curing the thermally colour-changeable ceramic coating composition as taught herein may be performed at a temperature of at least 180° C. The step of curing the thermally colour-changeable ceramic coating composition as taught herein may be performed at a temperature of 280-320° C. for 7 to 10 min. Longer curing times and/or higher temperatures allow a denser coating layer to be achieved.

In certain embodiments, once the thermally colour-changeable ceramic coating composition as taught herein has been applied to the item of cookware, the thermally colour-changeable ceramic coating is cured, for instance at a peak metal part temperature, e.g. around 300° C. This causes the thermally colour-changeable ceramic coating to solidify and be locked into the anchor pattern. In other words, the adhesion of the thermally colour-changeable ceramic coating as taught herein to the artefact surface, for instance a cookware, is mainly mechanical although there may be some weak chemical bonding of the silicon atoms (in the silane or oligomer thereof) to the artefact surface, for instance to the metal oxide layer of the artefact surface.

A further aspect relates to a kit for preparing a thermally colour-changeable ceramic coating composition as taught herein, or a thermally colour-changeable ceramic coating as taught herein, comprising: (a) a first solution comprising a silica mixture, a functional filler, a ceramic powder that emits far-infrared ray-radiation and anions, a white inorganic pigment, a thermally colour-changeable yellow inorganic pigment, and a thermally colour-changeable green inorganic pigment in a first container; and (b) a second solution comprising a silane or an oligomer thereof as a binder. The first and second solutions, when mixed, provide the thermally colour-changeable ceramic coating composition as described herein, for instance, comprising 68-80% by weight (wt %) of an inorganic ceramic coating composition, 0-25 wt % of a white inorganic pigment, 1-20 wt % of a thermally colour-changeable yellow inorganic pigment, and 0-3 wt % of a thermally colour-changeable green inorganic pigment, with wt % compared with the total weight of the thermally colour-changeable ceramic coating composition.

Acid catalyst may be added in catalytic amounts to the first and/or second solution of the kit, or may be provided as a third solution. The acid catalyst catalyses oligomerisation of the silane. The amount of catalytic acid present in first and/or second solution, or optional third solution of the kit is such that it is less than 1 wt % in the thermally colour-changeable ceramic coating composition i.e. when the solutions are mixed, wt % is compared with the total weight of the thermally colour-changeable ceramic coating composition.

A further aspect relates to an artefact, in particular an item of cookware coated with the thermally colour-changeable ceramic coating as taught herein.

The terms "cookware" may be used interchangeably herein and refer to a kitchen utensil made of material used for cooking.

Preferably, the cookware item is a cooking vessel.

The term "cooking vessel" refers to any food preparation vessel made of a heat-resistant material. In certain embodiments, the cookware, in particular the cooking vessel, may be a pan such as a frying pan. In certain embodiments, the cookware, in particular the cooking vessel, may be a pot.

In certain embodiments, the cookware item can be made of aluminium, hard anodized aluminium, cast iron, steel, stainless steel, multi-ply materials and any other material substrate commonly used in cookware body construction.

In certain embodiments, the cookware item may be overall coated with the thermally colour-changeable ceramic coating as taught herein, i.e., the thermally colour-changeable ceramic coating as taught herein may completely cover the cookware item. In certain embodiments, parts of the cookware item may be coated with the thermally colour-changeable ceramic coating as taught herein. In certain embodiments, the interior surface, the exterior surface, and/or the handle and/or lid of the cookware item may be coated with the thermally colour-changeable ceramic coating as taught herein.

In certain embodiments, the interior surface of the cookware item may be coated with the thermally colour-changeable ceramic coating as taught herein. In certain embodiments, the interior surface and the exterior surface of the cookware item may be coated with the thermally colour-changeable ceramic coating as taught herein. In certain embodiments, the interior surface, the exterior surface, and the handle of the cookware item may be coated with the thermally colour-changeable ceramic coating as taught herein. In certain embodiments, the interior surface and the handle of the cookware item may be coated with the thermally colour-changeable ceramic coating as taught herein.

In certain embodiments, the artefact, in particular the cookware item may comprise the thermally colour-changeable ceramic coating as taught herein and an additional coating. For instance, the artefact, in particular the cookware item may be coated with a non-stick coating. In certain embodiments, the artefact, in particular the cookware item may be coated with an inorganic ceramic coating. For instance, the artefact, in particular the cookware item may be coated with a non-stick inorganic ceramic coating. In certain embodiments, the artefact, in particular the cookware item may be coated with a fluoropolymer coating such as PFA or polytetrafluoroethylene (PTFE).

In certain embodiment, the artefact, in particular the cookware item may be coated with one layer of the thermally colour-changeable ceramic coating as taught herein. In certain embodiment, the artefact, in particular the cookware item may be coated with multiple layers of the thermally colour-changeable ceramic coating as taught herein. For example, the artefact, in particular the cookware item may be coated with two or more, three or more, or four or more layers of the thermally colour-changeable ceramic coating as taught herein.

Non-limiting examples of a thermally colour-changeable ceramic coating composition, a thermally colour-changeable ceramic coating, an artefact, in particular the cookware item coated with the thermally colour-changeable ceramic coating, and the use of the thermally colour-changeable ceramic coating composition for coating an artefact, in particular the cookware item, as taught herein are described below.

EXAMPLES

Example 1: Preparation of Inorganic Ceramic Coating Compositions 1.1 Preparation of Inorganic Ceramic Coating Composition 1

Based on the total weight of inorganic ceramic coating composition, 50 wt % of a solution containing 40% wt methyltrimethoxysilane (MTMS) as a binder in ethanol; 30 wt % of a silica mixture consisting of 40 wt % of silicon dioxide powder ($SiO_2$) having a particle size of 0.2 μm and 60 wt % of water; 5 wt % of quartz as a functional filler; and 5 wt % of ceramic powder consisting of a 1:1 mixture of the far-infrared ray-radiating material tourmaline and the anion-emitting material vanadium, the balance containing ethanol were mixed with each other, thereby preparing the inorganic ceramic coating composition 1.

1.2 Preparation of Inorganic Ceramic Coating Composition 2

Based on the total weight, 40 wt % of a solution containing 40% wt methyltrimethoxysilane (MTMS) as a binder in ethanol; 35 wt % of a silica mixture consisting of 20 wt % of silicon dioxide powder ($SiO_2$) having a particle size of 1.0 µm and 80 wt % of water; 7 wt % of monzonite loess as a functional filler; and 3 wt % of ceramic powder consisting of a 1:1 mixture of the far-infrared ray-radiating material loess and the anion-emitting material strontium, the balance containing ethanol were mixed with each other, thereby preparing the inorganic ceramic coating composition 2.

Example 2: Preparation of Thermally Colour-Changeable Ceramic Coating Compositions According to Embodiments of the Present Invention 2.1 Preparation of Thermally Colour-Changeable Ceramic Coating Composition 1 According to an Embodiment of the Present Invention Based on the total weight, 75 wt % of the inorganic ceramic coating composition prepared in Preparation Example (i), 22 wt % of white inorganic pigment, 2 wt % of niobium (Nb) as a thermally colour-changeable yellow inorganic pigment and 1 wt % of iron oxide as a thermally colour-changeable green inorganic pigment were mixed with each other, thereby preparing a thermally colour-changeable ceramic coating composition 1 according to an embodiment of the present invention.

2.2 Preparation of Thermally Colour-Changeable Ceramic Coating Composition 2 According to an Embodiment of the Present Invention Based on the total weight, 75 wt % of the inorganic ceramic coating composition prepared in Preparation Example 2, 20 wt % of white inorganic pigment, 4 wt % of niobium (Nb) as a thermally colour-changeable yellow inorganic pigment and 1 wt % of iron oxide as a thermally colour-changeable green inorganic pigment were mixed with, thereby preparing a thermally colour-changeable ceramic coating composition 2 according to an embodiment of the present invention.

Example 3: Preparation of Comparative Coating Compositions 3.1 Preparation of Comparative Coating Composition 1

Based on the total weight, 75 wt % of the inorganic ceramic coating composition prepared in Preparation Example 1, and 25 wt % of white inorganic pigment were mixed with each other, thereby preparing a comparative coating composition 1.

3.2 Preparation of Comparative Coating Composition 2

Based on the total weight, 75 wt % of the inorganic ceramic coating composition prepared in Preparation Example 2, and 20 wt % of white inorganic pigment, 4 wt % of a typical non-thermochromic inorganic yellow pigment, and 1 wt % of a typical non-thermochromic inorganic green pigment were mixed with each other, thereby preparing a comparative coating composition 2.

Example 4: Evaluation of Thermally Colour-Changeable Ceramic Coating Compositions According to Embodiments of the Present Invention Each of the thermally colour-changeable ceramic coating compositions 1 and 2 according to embodiments of the present invention and each of the comparative coating compositions 1 and 2 was coated by spraying on the interior surface of a frying pan to a thickness of 40 µm, and curing at 300° C. for 10 minutes.

The colour change of the coating layer with a change in temperature was visually observed, and the results of the observation are shown in FIGS. 1A and 1B and 2A and 2B.

Herein, the frying pans coated with the thermally colour-changeable ceramic coating composition 1 according to an embodiment of the invention and the frying pans coated with the comparative coating composition 1 had the Pantone colour PMS580C at room temperature. The frying pans coated with the thermally colour-changeable ceramic coating composition 2 according to an embodiment of the invention and the frying pans coated with the comparative coating composition 2 had the Pantone colour PMS615C at room temperature.

Figure 1A:
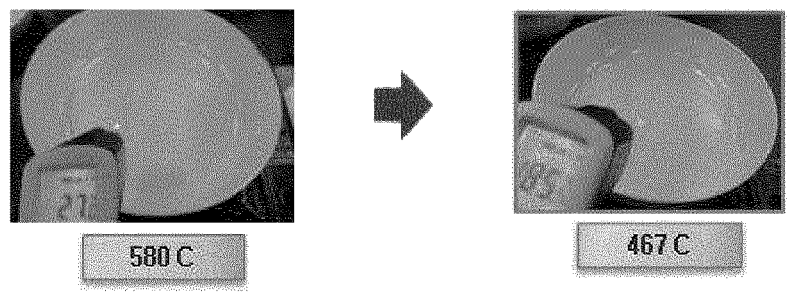
FIG. 1A represents a photograph illustrating the colour change of a frying pan coated with a thermally colour-changeable ceramic coating composition according to an embodiment of the invention having the Pantone 580C colour at room temperature and the Pantone 467C colour at 187° C.
Figure 1B:
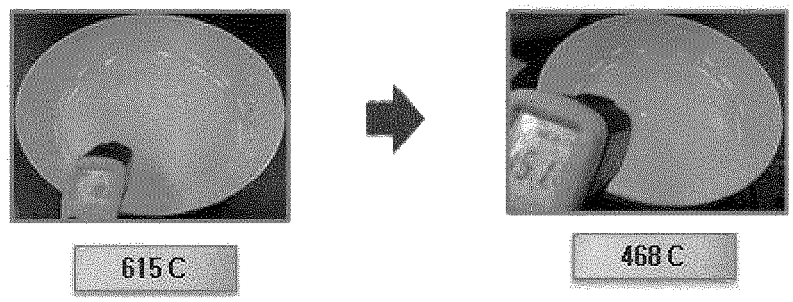
FIG. 1B represents a photograph illustrating the colour change of a frying pan coated with a thermally colour-changeable ceramic coating composition according to an embodiment of the invention having the Pantone 615C colour at room temperature and the Pantone 468C colour at 151° C.

As shown in FIG. 1A, the interior surface of the frying pan coated with the thermally colour-changeable ceramic coating composition 1 illustrating the present invention and having the Pantone colour PMS580C at 27° C. exhibited a colour change to the Pantone colour PMS467C when the temperature increased to 187° C. In addition, the interior surface of the frying pan coated with the thermally colour-changeable ceramic coating composition 2 illustrating the present invention and having the Pantone colour PMS615C at 18° C. exhibited a colour change to the Pantone colour PMS468C when the temperature increased to 151° C. (FIG. 1B). Both colour changes were reversed when the temperatures reverted back to the starting temperatures.

Figure 2A:
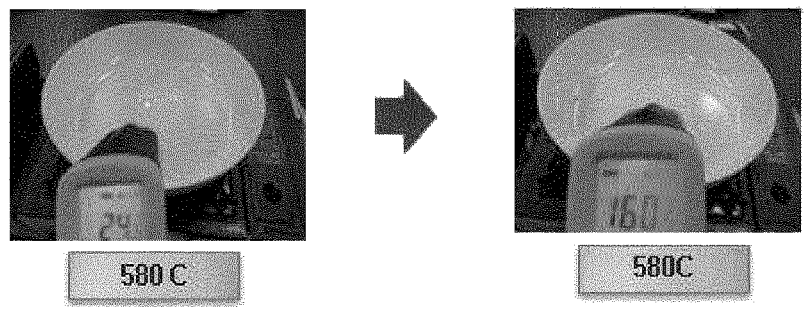
FIG. 2A represents a photograph illustrating the colour change of a frying pan coated with a comparative coating composition having the Pantone 580C colour at 24° C. and at 160° C.
Figure 2B:
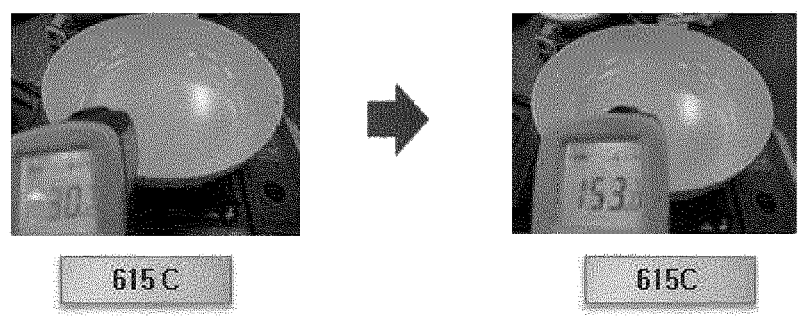
FIG. 2B represents a photograph illustrating the colour change of a frying pan coated with a comparative coating composition having the Pantone 615C colour at 30° C. and at 153° C.

However, as shown in FIG. 2A, the interior surface of the frying pan coated with comparative coating composition 1 and having the Pantone colour PMS580C at 24° C. exhibited no colour change, even when the temperature increased to 160° C. In addition, the interior surface of the frying pan coated with comparative coating composition 2 and having the Pantone colour PMS615C at 30° C. exhibited no colour change, even when the temperature increased to 153° C. (FIG. 2B).

In conclusion, the experimental results show that the thermally colour-changeable ceramic coating compositions 1 and 2 according to embodiments of the present invention can reversibly thermally change colour, because they comprise the yellow inorganic pigment and the green inorganic pigment. When coated on cookware such as frying pans, and suitably heating the cookware, the thermally colour-changeable ceramic coating compositions 1 and 2 according to embodiments of the present invention easily allow seeing visually a change in the temperature of the cookware.

Example 5: Evaluation of Thermochromic Properties of Different Thermally Colour-Changeable Ceramic Coating Compositions The inorganic ceramic coating composition 1 or 2 prepared in Example 1.1 or 1.2 was mixed with a thermally colour-changeable yellow inorganic pigment and optionally a thermally colour-changeable green inorganic pigment and optionally a white inorganic pigment, as shown in Table 1, thereby preparing different thermally colour-changeable ceramic coating compositions i.e., thermally colour-changeable ceramic coating compositions I to X.

TABLE 1

Composition of thermally colour-changeable ceramic coating compositions I to VI.

| Coating Composition | Inorganic Ceramic Coating Composition (either Preparation Example 1 or 2) (wt %) | White Inorganic Pigment (wt %) | Thermochromic Inorganic Yellow Pigment (wt %) | Thermochromic Inorganic Green Pigment (wt %) |
|---|---|---|---|---|
| I | 75 | 22 | 2 | 1 |
| II | 75 | 20 | 4 | 1 |
| III | 75 | 17 | 7 | 1 |
| IV | 75 | 2 | 20 | 3 |
| V | 75 | 22 | 3 | — |
| VI | 75 | 20 | 5 | — |
| VII | 75 | — | 20 | 5 |
| VIII | 75 | 9 | 15 | 1 |
| IX | 75 | 23 | 1 | 1 |
| X | 75 | 3 | 15 | 7 |

Each of the thermally colour-changeable ceramic coating compositions I, II, III, IV, V, VI, VII, VIII, IX and X was coated on the interior surface of a frying pan to a thickness of 40 µm, and cured. The experiments were performed in triplicate, i.e. on several pans.

The thermal colour change was evaluated visually during temperature increase by comparison with RAL colours. The results of the observations are described in Table 2 and shown in FIGS. 3 to 8.

TABLE 2

Thermal colour change of thermally colour-changeable ceramic coating compositions I to VI. Colours were measured either on the RAL or PMS scale, which ever provided the closest match. For ease of comparison, RAL values have been converted to the closest PMS values which are indicated in brackets.

| Coating Composition | Temperature | | | |
|---|---|---|---|---|
| | Room temperature | 120° C. | 150° C. | 220° C. |
| I, FIG. 3 | Very light Green PMS7485C | PMS7500C | PMS7500C | RAL1015 (PMS 9161C) |
| II, FIG. 4 | Light Green PMS5797C | PMS4545C | PMS7500C | Deep Cream RAL1014 (PMS 9161C) |
| III, FIG. 5 | Light Green PMS614C | PMS607C | PMS7402C | Deep Cream PMS155C |
| IV, FIG. 6 | Yellowish Green PMS103C | RAL1005 (PMS1245C) | RAL1004 (PMS7555C) | Orange PMS131C |
| V, FIG. 7 | Light yellowish White PMS5807C | PMS7500C | PMS7501C | Dark yellowish White PMS7501U |
| VI, FIG. 8 | Light Green PMS607C | PMS7506C | PMS7506C | Darker Cream PMS475C |
| VII, FIG. 9 | Light Green PMS397C | nm | nm | Darker cream PMS111C |
| VIII, FIG. 10 | Light Green PMS610C | nm | nm | Darker cream PMS141C |
| IX, FIG. 11 | Light yellowish white PMS621C | nm | nm | Darker yellowish white PMS5595C |
| X, FIG. 12 | Light green PMS390U | nm | nm | Darker cream PMS3975U |

Key: nm—not measured.

Herein, the frying pans coated with the thermally colour-changeable ceramic coating composition I according to an embodiment of the invention had the Pantone colour PMS7485C at room temperature (FIG. 3, panel A). The frying pans coated with the thermally colour-changeable ceramic coating composition II according to an embodiment of the invention had the Pantone colour PMS5797C at room temperature (FIG. 4, panel A). The frying pans coated with the thermally colour-changeable ceramic coating composition III according to an embodiment of the invention had the Pantone colour PMS614C at room temperature (FIG. 5, panel A). The frying pans coated with the thermally colour-changeable ceramic coating composition IV according to an embodiment of the invention had the Pantone colour PMS103C at room temperature (FIG. 6, panel A). The frying pans coated with the thermally colour-changeable ceramic coating composition V according to an embodiment of the invention had the Pantone colour PMS5807C at room temperature (FIG. 7, panel A). The frying pans coated with the thermally colour-changeable ceramic coating composition VI according to an embodiment of the invention had the Pantone colour PMS607C at room temperature (FIG. 8, panel A).

As shown in FIG. 3, the interior surface of the frying pan coated with the thermally colour-changeable ceramic coating composition I illustrating the present invention changed gradually from very light Green to Cream RAL 9001 colour at 216° C. (FIG. 3, panels B to D). The colour of the interior surface of the frying pan coated with the thermally colour-changeable ceramic coating composition II illustrating the present invention started to change distinctly from light Green to deep Cream RAL 9001 colour at 217° C. (FIG. 4, panels B to D). As shown in FIG. 5, the colour of the interior surface of the frying pan coated with the thermally colour-changeable ceramic coating composition III illustrating the present invention began to change distinctly from light Green to deeper Cream RAL 9001 colour at 229° C. (FIG. 5, panels B to D). As shown in FIG. 6, the colour of the interior surface of the frying pan coated with the thermally colour-changeable ceramic coating composition IV illustrating the present invention changed dramatically from yellowish Green to Orange at 220° C. (FIG. 6, panels B to D). As shown in FIG. 7, the colour of the interior surface of the frying pan coated with the thermally colour-changeable ceramic coating composition V illustrating the present invention changed from light yellowish white to dark yellowish white at 220° C. (FIG. 7, panels A to D). As shown in FIG. 8, the colour of the interior surface of the frying pan coated with the thermally colour-changeable ceramic coating composition VI changed clearly from light green to darker cream RAL 9001 colour at 216° C. (FIG. 9, panels A to D). As shown in FIG. 9, the colour of the interior surface of the frying pan coated with the thermally colour-changeable ceramic coating composition VII changed clearly from light green to darker cream colour at 220° C. (FIG. 9, panels A to D). As shown in FIG. 10, the colour of the interior surface of the frying pan coated with the thermally colour-changeable ceramic coating composition VIII changed clearly from light green to darker cream colour at 220° C. (FIG. 10, panels A to D). As shown in FIG. 11, the colour of the interior surface of the frying pan coated with the thermally colour-changeable ceramic coating composition IX changed from light yellowish white to darker yellowish white at 220° C. (FIG. 11, panels A to D). As shown in FIG. 12, the colour of the interior surface of the frying pan coated with the thermally colour-changeable ceramic coating composition IX changed from light green to darker cream at 220° C. (FIG. 12, panels A to D).

The thermal colour change of each of compositions I to X was also evaluated using a colour analyser (TES-135 manufactured by TES Electrical Electronic Corp), and a colour difference (ΔE) was determined between the colour of the pan coating at room temperature and after heating to ~220° C. A higher value of ΔE is indicative of a greater colour change. The results of the observations are given in Table 3.

TABLE 3

Thermal colour change of thermally colour-changeable ceramic coating compositions I to X. Colours were measured using a colour meter (TES135) set to determine colour difference ΔE between samples at room temperatures and after heating to ~220° C.

| Coating Composition | ΔE |
| --- | --- |
| I, FIG. 3 | 8 |
| II, FIG. 4 | 8 |
| III, FIG. 5 | 11 |
| IV, FIG. 6 | 24 |
| V, FIG. 7 | 11 |
| VI, FIG. 8 | 12 |
| VII, FIG. 9 | 29 |
| VIII, FIG. 10 | 15 |
| IX, FIG. 11 | 3.3 |
| X, FIG. 12 | 2.3 |

Composition IX and X showed the smallest colour difference, while samples IV, VII and VIII showed the greatest colour difference.

Example 6: Evaluation of Durability of Colour-Changeable Properties of Thermally Colour-Changeable Ceramic Coating Compositions According to Embodiments of the Present Invention Compared with a Commercially Available Pan Testing showed that after the Thermal Shock Tests (260° C. for 10 minutes and then quench, repeated 40 times using the coating of composition I) and an oven test at 300° C. for 2 hours, there was no damage to the colour change properties of the coating.

In contrast, many of the thermally colour-changeable coatings in the market today comprise organic pigments which are easily damaged by heat at ordinary cooking temperatures. Furthermore, the organic pigments change colour below normal cooking temperatures. Also, if a pan with a prior art thermally colour-changeable coating is overheated once or twice, the reversibility of the colour change breaks down or is even completely abolished.

In order to illustrate the aforementioned disadvantages, the properties of colour-changing frying pans of the art were tested. First, the colour change was examined of a typical commercially available frying pan of the art for which it was advertised that "the pan changes colour form blue to white as it heats to show when an even cooking temperature is reached". As shown in FIGS. 13A and 13B, the temperature at which the colour change occurred hardly melted butter. So, the temperature at which the colour change occurred, was about 32-35° C. Consequently, the temperature at which the colour change occurred was much below the temperatures required for useful cooking purposes.

Temperature resistance tests were performed by heating the interior of the frying pan to 160° C. for 30 min, subsequently cooling the pan, and repeating this process in 20° C. increments up to 240° C., maintaining each temperature for 30 min. It was observed that from about 100° C. a malodour was detected. Also, between 200° C. and 220° C. the colour change pigment started to degrade and turned yellow. After cooling the frying pan was yellowed. It was observed that beyond 200-220° C. the colour change became irreversible.

In addition, heat oil resistance tests were performed by heating extra virgin olive oil for 20 min at 260° C. As a result, the frying pan was discoloured, the non-stick properties were gone, and the colour change was damaged.

Furthermore, hot vegetable oil tests were performed by heating vegetable oil for 2 hours at 220° C. The interior coating of the frying pan was damaged by exposure to 220° C. and was discoloured by the oil. Also, the colour change was irreversible even when cooled and so, the colour-changeable property of the frying pan was abolished.

The frying pan was also subjected to heat resistance test wherein the frying pan was heated for 5 hours at 425° C. As a result, the interior and exterior showed discolouration. Also, a weight loss of 0.9 g was measured which may indicate that material had vaporized. Hence, the frying pans of the art may release unwanted materials into the cooking zone by degradation of heat-sensitive molecules.

In conclusion, the colour change of the coatings prepared with the thermally colour-changeable ceramic coating compositions illustrating the invention is durable and hence, the colour change was not damaged by high temperature (tested up to 300° C.) or thermal cycling. The colour change of the thermally colour-changeable ceramic coating was extremely long-lasting (perhaps infinite) in contrast with the thermally colour-changeable coating of prior art frying pans. With the thermally colour-changeable ceramic coating compositions illustrating the invention, the colour change remained just as clear as the first time and remained reversible.

Furthermore, the non-stick durability was just as good in comparison with a standard Grey ceramic non-stick coating (prepared as described in Comparative Example 1).

Example 7: Evaluation of in-Use Properties of a Pan Coated with a Composition of the Invention An aluminium frying pan, pre-treated by sandblasting was coated by spraying with a composition of the invention. The coating was cured at 300° C./10 min.

Example 7.1 Fried Egg Test

The frying pan sample was placed on an electrical hot plate at 150° C. An egg was cooked until lightly brown for 2 minutes. The egg was turned over in the sample pan with a plastic spatula. It was record whether the egg was easily removed intact and whether any residue remains. The test was repeated 5 times. The pan received a top rating, Grade 5, wherein Grade 5 is Excellent, no sticking in center or edges of egg, the residue did not remain; Grade 4 is Good, slight sticking around edges, a residue of within 1 cm² remained; Grade 3 is Fair, slight sticking in edges and center, a residue of within 3-4 cm² remained; Grade 2 is Poor, requires considerable effort to free egg, a residue of up to half of the egg remained, Grade 1 is Very Poor, the egg cannot be freed from surface without breaking up, a residue of at least ¾ egg remains. A "Pass" is Grade 5. Grades 3 and 4 require a re-test. "Fail" is Grade 1 and 2.

Example 7.2 Release Following Temperature Shock

The frying pan sample was placed on an electrical hot plate at 260° C. and maintained for 10 minutes. The sample was quenched the under tap water at ambient temperature. The heating/quenching was repeated for 10 cycles, and any problems with the coating noted i.e. there was an inspection for damage and discolouration—there was none. Subsequently, 2 eggs were fried one at a time, cooling and cleaning the sample pan after each frying step. The pan received a top rating, Grade 5, after each frying.

Example 7.3 Release Following Condensed Milk Browning

The frying pan sample was placed on an electrical hot plate at 150° C. One cup of condensed milk was poured in, and a steady heat maintained until the milk browned. It was removed with a wooden spatula; there were no residues. After cleaning with a damp cloth, there was no stains or defects. Subsequently, 2 eggs were fried one at a time, cooling and cleaning the sample pan after each frying step. The pan received a top rating, Grade 5, after each frying.

Example 7.4 Release Following Burnt Sugar Treatment

The frying pan sample was placed on an electrical hot plate until the base reached 150° C. One tablespoon of granulated sugar was poured onto the surface, and a steady heat maintained until the sugar caramelised. The sugar was quenched under tap water at ambient temperature. The sugar was removed with a wooden spatula, there were no residues. After cleaning with a damp cloth, there was no stains or defects such as blistering. Subsequently, 2 eggs were fried one at a time, cooling and cleaning the sample pan after each frying step. The pan received a top rating, Grade 5, after each frying.

Example 7.4 Release Following Burnt Oatmeal Treatment

The frying pan sample was placed on an electrical hot plate at high heat. Half a cup of oatmeal with 1 cup of water was poured onto the surface, and the high heat maintained for 18 minutes. The oatmeal was removed with a wooden spatula, and cleaned with a damp cloth; there were minimal residues. After cleaning with a damp cloth, there was minimal stains or defects such as blistering. Subsequently, 2 eggs were fried one at a time, cooling and cleaning the sample pan after each frying step. The pan received a top rating, Grade 5, after each frying.

Example 7.5 Release Following Burnt Tomato Ketchup Treatment

The frying pan sample was placed on an electrical hot plate. A 50/50 mix of ketchup and was prepared, containing ¼ teaspoon of salt per litre. The mixture was added to the pan until half full, and allowed to simmer for 1 hour. After cleaning in warm soapy water, there were no stains or defects such as blistering. Subsequently, 2 eggs were fried one at a time, cooling and cleaning the sample pan after each frying step. The pan received a top rating, Grade 5, after each frying.

Example 7.6 Release Following Vinegar and Oil Treatment

The frying pan sample was placed on an electrical hot plate. A mix of 700 g water, 200 g vinegar, 100 g cooking oil and 50 g salt was prepared. The mixture was added to the pan until half full, and allowed to simmer for 1 hour. The level was topped up as needed with water. The pan was taken out and cooled. After cleaning in warm soapy water, there were no stains or defects such as blistering. Subsequently, 2 eggs were fried one at a time, cooling and cleaning the sample pan after each frying step. The pan received a top rating, Grade 5, after each frying.

Example 7.7 Release Following Oil Treatment

Cooking oil was poured into the frying pan sample to form a shallow pool. The pan was placed in a oven heated to 220° C. for 2 hours. The pan was taken out and cooled. After cleaning in warm soapy water, there were no stains or defects such as blistering. Subsequently, 2 eggs were fried one at a time, cooling and cleaning the sample pan after each frying step. The pan received a top rating, Grade 5, after each frying.

Example 7.8 Release Following Salt-Water Treatment

Salt water (5 wt %) was poured into the frying pan sample until half full. The mixture was allowed to simmer for 3 hour. The pan was cooled. After cleaning in water, there were no stains or defects such as blistering. Subsequently, 2 eggs were fried one at a time, cooling and cleaning the sample pan after each frying step. The pan received a top rating, Grade 5, after each frying.

Example 7.10 Boiling Dishwater Detergent Test

A PH11 solution of dishwater detergent was prepared. The solution was added to the pan until half full, and allowed to simmer for 1 hour. The pan was cooled. After cleaning in water, there were no stains or defects such as blistering.

The invention claimed is:

1. An inorganic thermochromic additive for an inorganic ceramic coating composition, comprising 60-96 wt % of a colour-changeable yellow inorganic pigment, 4-24 wt % of a colour-changeable green inorganic pigment, and 0-36 wt % of a weight white inorganic pigment, with wt % compared with the total weight of the inorganic thermochromic additive;
   wherein the thermally colour-changeable yellow inorganic pigment comprises one or more metal pigments containing niobium (Nb), tin (Sn), zinc (Zn), or titanium (Ti);
   wherein the thermally colour-changeable green inorganic pigment is an iron oxide pigment, wherein the iron has a valency of 2; and
   wherein the white inorganic pigment comprises one or more of titanium dioxide, silicon dioxide, aluminium hydroxide, and zirconium oxide.

2. A thermally colour-changeable ceramic coating composition comprising the inorganic thermochromic additive according to claim 1 and the inorganic ceramic coating composition.

3. The thermally colour-changeable ceramic coating composition according to claim 2, wherein the inorganic ceramic coating composition comprises silica or zirconia.

4. The thermally colour-changeable ceramic coating composition according to claim 2, wherein the inorganic ceramic coating composition is present at 68-80% by weight (wt %), and the inorganic thermochromic additive is present at 22-32 wt %, with wt % compared with the total weight of the thermally colour-changeable ceramic coating composition.

5. The thermally colour-changeable ceramic coating composition according to claim 2, wherein the inorganic ceramic coating composition comprises:
   (a) 6-25 wt % of a silane or an oligomer thereof as a binder;
   (b) 25-60 wt % of a silica mixture;
   (c) 0-10 wt % of a functional filler and/or a ceramic powder that emits far infrared radiation and anions,
   with wt % compared with the total weight of the inorganic ceramic coating composition.

6. A method of preparing a thermally colour-changeable ceramic coating composition comprising incorporating the inorganic thermochromic additive according to claim 1 into the composition.

7. A thermally colour-changeable ceramic coating prepared from the thermally colour-changeable ceramic coating composition according to claim 2.

8. A method of coating an artefact comprising applying the thermally colour-changeable ceramic coating composition according to claim 2 to the artefact.

9. An artefact coated with the thermally colour-changeable ceramic coating composition according to claim 2.

10. The method according to claim 8, wherein the artifact is a cookware item.

11. The artefact according to claim 9, wherein the artifact is a cookware item.

* * * * *